US011932286B2

(12) United States Patent
Tam

(10) Patent No.: US 11,932,286 B2
(45) Date of Patent: *Mar. 19, 2024

(54) RESPONDER OVERSIGHT SYSTEM FOR AN AUTONOMOUS VEHICLE

(71) Applicant: TuSimple, Inc., San Diego, CA (US)

(72) Inventor: Joyce Tam, Pleasanton, CA (US)

(73) Assignee: TUSIMPLE, INC., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/822,890

(22) Filed: Aug. 29, 2022

(65) Prior Publication Data

US 2023/0001951 A1 Jan. 5, 2023

Related U.S. Application Data

(63) Continuation of application No. 17/150,581, filed on Jan. 15, 2021, now Pat. No. 11,447,156.

(51) Int. Cl.
*B60W 60/00* (2020.01)
*G05D 1/00* (2006.01)
*G05D 1/02* (2020.01)
*G07C 5/00* (2006.01)
*G07C 5/08* (2006.01)

(52) U.S. Cl.
CPC ......... B60W 60/007 (2020.02); G05D 1/0061 (2013.01); G05D 1/0214 (2013.01); G05D 1/0276 (2013.01); G07C 5/008 (2013.01); G07C 5/0841 (2013.01); B60W 2510/0676 (2013.01);

(Continued)

(58) Field of Classification Search
CPC ....... B60W 60/007; B60W 2510/0676; B60W 2530/10; B60W 2556/45; B60W 60/001; G05D 1/0061; G05D 1/0214; G05D 1/0276; G05D 1/0011; G05D 1/0022; G07C 5/008; G07C 5/0841; G07C 5/0808; G06F 21/554; G06Q 10/10; G06Q 50/265; G06Q 50/30; G08G 1/017; G08G 1/205; H04L 63/083;

(Continued)

(56) References Cited

U.S. PATENT DOCUMENTS 10,081,334 B1 * 9/2018 Chen ................ G07C 5/008
10,086,782 B1 * 10/2018 Konrardy ............ B60L 53/36

(Continued)

FOREIGN PATENT DOCUMENTS

EP 3652721 A1 5/2020

*Primary Examiner* — Rodney A Butler
(74) *Attorney, Agent, or Firm* — Paul Liu; Baker Botts L.L.P.

(57) ABSTRACT

A system includes an autonomous vehicle (AV) comprising a sensor, a control subsystem, and an operation server. The control subsystem receives sensor data comprising location coordinates of the AV from the sensor. The operation server detects an unexpected event from the sensor data, comprising at least one of an accident, an inspection, and a report request. The operation server receives a message from a user comprising a request to access particular information regarding the AV and location data. The operation server associates the AV with the user if the location coordinates of the AV match location data of the user. The operation server establishes a communication path between the user and a remote operator for further communications.

18 Claims, 8 Drawing Sheets

(52) U.S. Cl.
CPC ..... *B60W 2530/10* (2013.01); *B60W 2556/45* (2020.02)

(58) Field of Classification Search
CPC ......... H04W 4/40; H04W 4/023; H04W 4/90; H04W 12/06
See application file for complete search history.

(56) References Cited

U.S. PATENT DOCUMENTS

| | | | |
|---|---|---|---|
| 11,188,074 B1* | 11/2021 | Benavidez | G05D 1/0044 |
| 2016/0139594 A1* | 5/2016 | Okumura | G05D 1/0022 |
| | | | 701/2 |
| 2017/0032585 A1* | 2/2017 | Stenneth | G05D 1/021 |
| 2017/0364069 A1 | 12/2017 | Colella et al. | |
| 2019/0196464 A1 | 6/2019 | Lockwood et al. | |
| 2019/0248326 A1 | 8/2019 | McIntosh | |
| 2019/0283709 A1 | 9/2019 | Lu et al. | |
| 2019/0346841 A1* | 11/2019 | Litkouhi | G05D 1/0246 |
| 2021/0072759 A1* | 3/2021 | Baek | G05D 1/0214 |

* cited by examiner

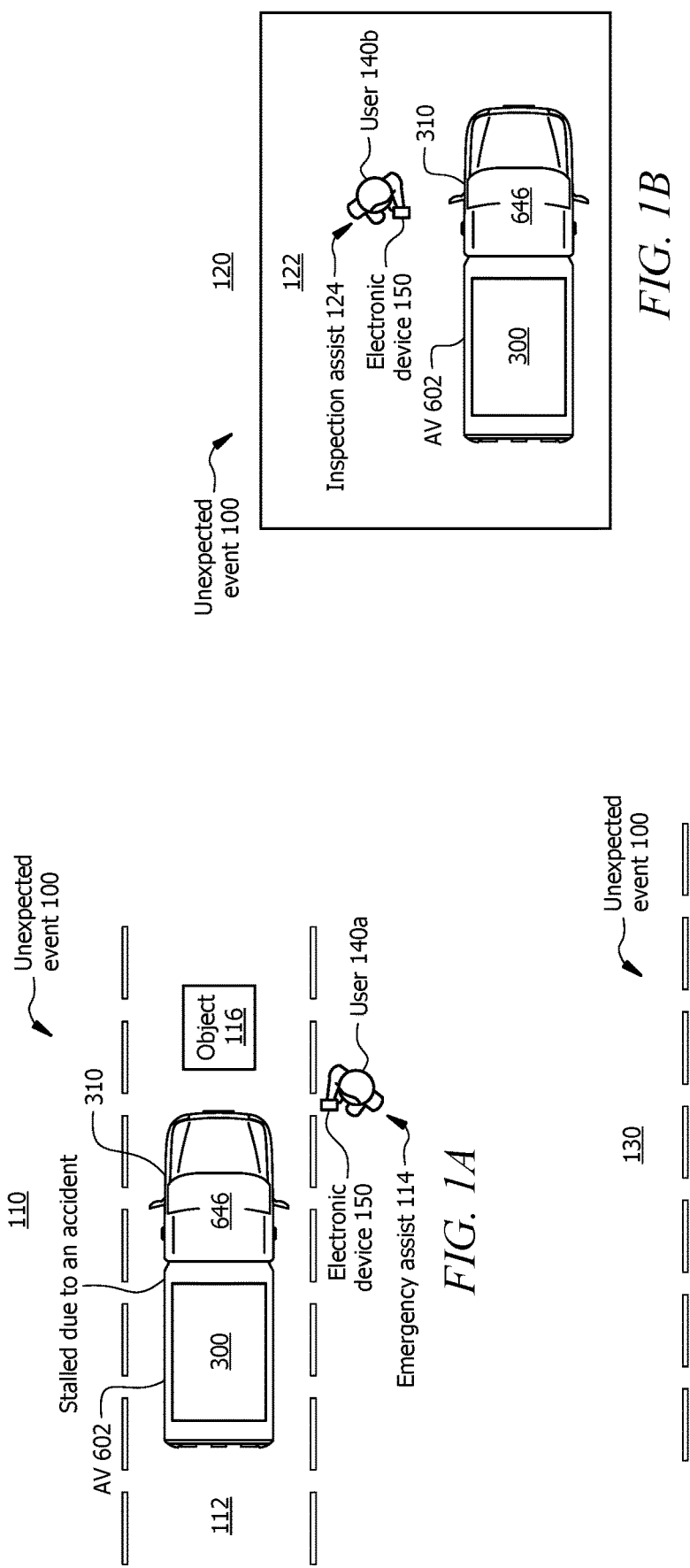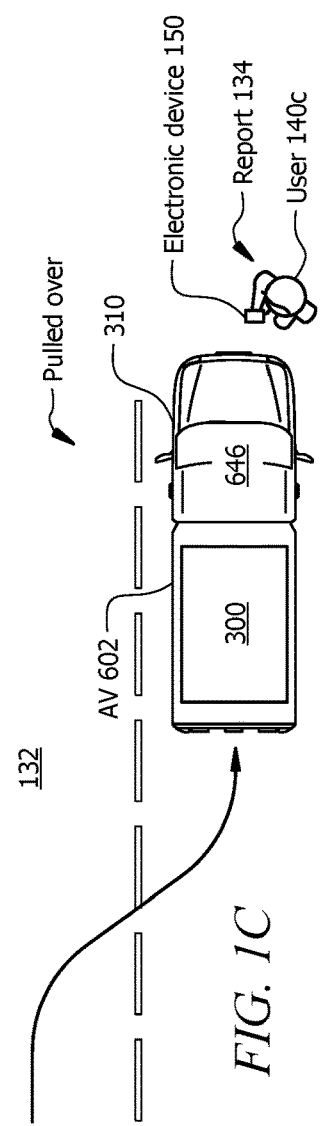
FIG. 1A
FIG. 1B
FIG. 1C

RESPONDER OVERSIGHT SYSTEM FOR AN AUTONOMOUS VEHICLE

CROSS-REFERENCE TO RELATED APPLICATION

The application is a continuation of U.S. patent application Ser. No. 17/150,581, filed Jan. 15, 2021, by Joyce Tam, and entitled "RESPONDER OVERSIGHT SYSTEM FOR AN AUTONOMOUS VEHICLE," which is incorporated herein by reference.

TECHNICAL FIELD

The present disclosure relates generally to autonomous vehicles. More particularly, the present disclosure is related to a responder oversight system for an autonomous vehicle.

BACKGROUND

One aim of autonomous vehicle technologies is to provide vehicles that can safely navigate towards a destination. In some cases, an autonomous vehicle may encounter an unexpected situation on its way to a destination. For example, an autonomous vehicle may be involved in an accident, an inspection, or stopped by a law enforcement officer. Current autonomous vehicle technologies may not be configured to account for encountering specific unexpected situations.

SUMMARY

This disclosure recognizes various problems and previously unmet needs related to autonomous vehicle (AV) involvement in an unexpected event. For example, current autonomous vehicle technologies may not be configured to account for situations where an AV encounters an unexpected event. Certain embodiments of this disclosure provide unique technical solutions to technical problems of the autonomous vehicle technologies, including those problems described above by facilitating coordination with a user (e.g., a first responder, law enforcement office, emergency personnel, etc.) who is at the AV to resolve an unexpected event involving the AV. Some examples of unexpected events include but are not limited to when the AV is involved in an accident, an inspection, pulled over to provide a report to a user, e.g., a law enforcement officer (i.e., encountered an unplanned pullover), and encountered an unplanned re-route situation (e.g., encountered a road closure, a road re-route sign, etc.).

In one embodiment, a system comprises an autonomous vehicle (AV), a control subsystem, and an operation server. The AV comprises at least one vehicle sensor located on the AV. The control subsystem is associated with the AV and comprises a first processor. The first processor is configured to receive sensor data from at least one vehicle sensor of the AV, where the sensor data comprises location coordinates of the AV. The first processor communicates the sensor data to the operation server.

The operation server is communicatively coupled with the control subsystem. The operation server comprises a second processor that is operably coupled with a memory. The memory of the operation server is operable to store login credentials of a user to an application by which the user is authorized to access information related to the AV.

The second processor is configured to detect an unexpected event related to the AV from the sensor data. The unexpected event comprises at least one of an accident, an inspection, and a report request related to the AV. The second processor receives a message from an electronic device associated with the user, where the message comprises a request to access particular information regarding the AV and location data of the user. The second processor determines whether the location data of the user matches the location coordinates of the AV. The second processor associates the AV with the user, in response to determining that the location data of the user matches the location coordinates of the AV. The second processor generates a ticket for the unexpected event to record events that will be carried out to address the unexpected event. The second processor establishes a communication path between the user and a remote operator using the electronic device. The second processor communicates the particular information related to the AV to the electronic device via the communication path. The second processor receives a request from the user to provide assistance to address the unexpected event. The second processor provides instructions to the remote operator to forward to the user to address the unexpected event. The second processor determines whether the unexpected event is addressed. The second processor closes the ticket, in response to determining that the unexpected event is addressed.

The disclosed systems provide several practical applications and technical advantages which include: 1) technology that automatically associates a user at the AV with the AV based on determining that location data of the user matches or corresponds to location coordinates of the AV; 2) technology establishes a communication path with the user at the AV using an electronic device of the user, by which the user is enabled to request particular information regarding the AV to resolve the unexpected event; 3) technology that determines and communicates particular information related to the AV, such as sensor data in a particular time duration, to the user to resolve the unexpected event; 4) technology that remotely grants entry to the user to enter the cab of the AV; 5) technology that establishes a second communication path with the user from an in-cab communication module to communicate the particular information to the user; 6) technology that remotely disengages autonomous functions of the AV; and 7) technology utilizes an emergency stop button for local disengagement of autonomous functions of the AV.

As such, the systems described in this disclosure may be integrated into a practical application of determining a more efficient, safe, and reliable solution to address and resolve an unexpected event involving the AV. For example, in a case where the AV is involved in an accident, the disclosed system provides particular information and instructions to be forwarded to the user to provide an emergency assist to resolve the accident. The particular information may include sensor data in a particular time duration in which the accident has occurred. The particular instructions may include instructions for entering a cab of the AV (upon remotely unlocking the entry door of the cab), locally disengaging autonomous functions of the AV, manually operating the AV to pull the AV over to a side of a road. In a particular example, where the AV is involved in an accident with a vehicle, the particular information may include an image/video feed from the sensor data recorded during the accident. As such, by accessing and reviewing the image/video feed, the user may be able to determine a safer way to assist passengers in the other vehicle that are stuck in their vehicle. As such, the disclosed system may provide an additional practical application of improving safety of passengers of the other vehicle that is involved in the accident with the AV.

In another example, in a case where the AV is requested to be inspected, the disclosed system provides particular information to be forwarded to the user to provide an inspection assist to conduct and conclude the inspection. The particular information may include one or more items on an inspection checklist, such as the health status report, physical characteristics status report (e.g., the weight, cargo, tire inflations, system's temperature, etc.), and autonomous faculties status report (e.g., autonomous algorithms/functions, sensor functions, map data, routing plan, etc.) associated with the AV.

In another example, in a case where the AV is requested to provide a report to a user, the disclosed system provides particular information to be forwarded to the user to satisfy the request of the user. The particular information may include one or more of a driving history of the AV in particular time duration, such as steering information, speed information (i.e., accelerometer readings), brake information, and health status report associated with the AV. As such, the disclosed systems may improve the autonomous vehicle technologies by accounting for unexpected situations/events and coordinating with a user at the AV to resolve the unexpected situations involving the AV.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIGS. 1A to 1C illustrate simplified schematic diagrams of example unexpected events involving an AV according to certain embodiments of this disclosure;

DETAILED DESCRIPTION

Figure 2:
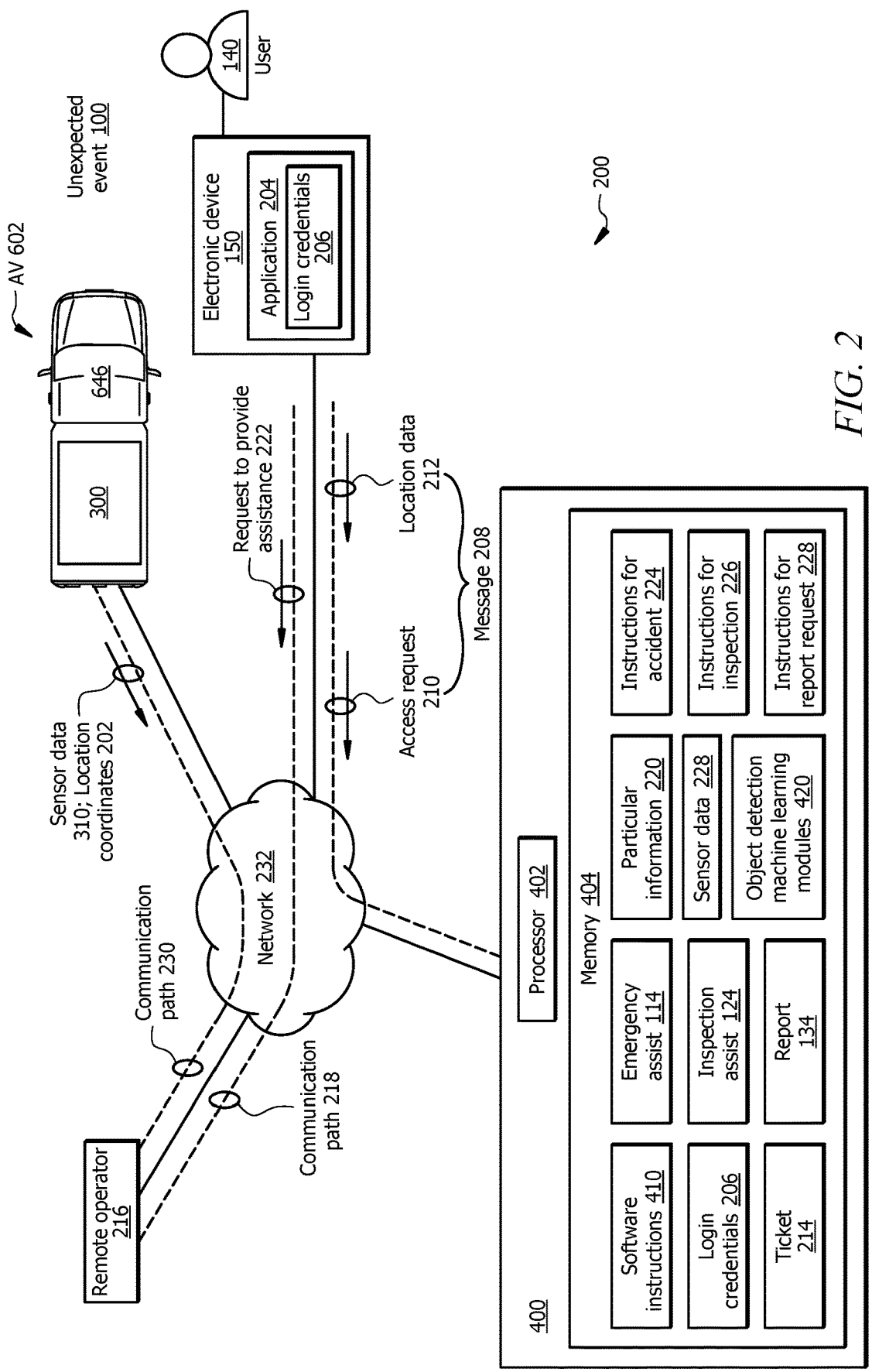
FIG. 2 illustrates an example system for coordinating with a user at the AV to resolve an unexpected event involving the AV.

As described above, previous technologies may fail to provide efficient, reliable, and safe solutions for addressing and resolving an unexpected event involving an AV. This disclosure provides various systems and methods for improving the autonomous vehicle technologies by providing provisions to address and resolve various unexpected events where the AV is involved.

Examples of Unexpected Events

FIGS. 1A to 1C illustrate simplified schematic diagrams of example unexpected events 100 involving an AV 602. In one embodiment, the AV 602 may include a semi-truck tractor unit attached to a trailer to transport cargo or freight from one location to another location (see FIG. 6). In this disclosure, the semi-truck tractor may be referred to as a cab of the AV 602. The AV 602 is navigated by a plurality of components described in detail in FIGS. 6-8. The operation of the AV 602 is described in greater detail below in FIG. 6. The corresponding description below includes brief descriptions of certain components of the AV 602.

In brief, the AV 602 includes a control subsystem 300 which is operated to facilitate autonomous driving of the AV 602. The control subsystem 300 of the AV 602 generally includes one or more computing devices in signal communication with other components of the AV 602 (see FIG. 6). The control subsystem 300 is generally configured to control the operation of the AV 602 and its components. The control subsystem 300 is further configured to determine a pathway in front of the AV 602 that is safe to travel and free of objects/obstacles, and navigate the AV 602 to travel in that pathway. This process is described in more detail in FIGS. 3, 4, and 6-8.

In brief, the control subsystem 300 receives sensor data 310 from one or more sensors 646 positioned on the AV 602 to determine a safe pathway to travel. The sensor data 310 includes data captured by the sensors 646. The sensors 646 are configured to capture any object within their detection zones or fields of view, such as landmarks, lane markings, lane boundaries, road boundaries, vehicles, pedestrians, road/traffic signs, among other objects. Sensors 646 may include cameras, LiDAR sensors, motion sensors, infrared sensors, and the like. In one embodiment, the sensors 646 may be positioned around the AV 602 to capture the environment surrounding the AV 602. In some cases, the sensor data 310 may include one or more indications indicating an unexpected event 100. In some examples, the unexpected events 100 involving the AV 602 may generally include at least one of an accident 110 (described in FIG. 1A), an inspection 120 (described in FIG. 1B), and a report request 130 (described in FIG. 1C).

Example Accident

FIG. 1A illustrates a simplified schematic diagram of an unexpected event 100, where the unexpected event 100 comprises an accident 110. As illustrated in FIG. 1A, the AV 602 is stalled due to an accident on a road 112. For example, assume that while the AV 602 was driving on the road 112, sensors 646 of the AV 602 capture the presence of an object 116 on the path of the AV 602 whose distance to the AV 602 was decreasing. As such, sensor data 310 captured by the sensors 646 may indicate a decreasing distance of the object 116 to the AV 602. Also, assume that despite the AV 602 attempting to maneuver to avoid the object 116, there is an impact with the object 116. As such, the sensor data 310 may further indicate the impact or collision with the object 116. Once the sensors 646 detect the impact, the AV 602 may stop in place, i.e., brakes 648b are applied (see FIG. 6). As such, the sensor data 310 related to the accident 110 may also indicate an unexpected stoppage of the AV 602. In response to detecting one or more indications that the AV 602 was involved in the accident 110, the autonomous faculties of the AV 602 may be stopped and the AV 602 stalled.

In such cases, a first user 140a may arrive at the scene of the accident 110 to provide an emergency assist 114 to address (and perhaps resolve) the accident 110. The first user 140a may be a first responder at the scene of the accident 110, such as a law enforcement officer, an emergency personnel, etc. The first user 140a may initiate a communication with an operation server 400 (see FIG. 2) using their electronic device 150 to request particular information regarding the AV 602 so that they can provide the emergency assist 114 upon being authenticated. This scenario is explained in more detail in conjunction with FIG. 2.

Example Inspection

FIG. 1B illustrates a simplified schematic diagram of an unexpected event 100, where the unexpected event 100 comprises an inspection 120. In one embodiment, inspection 120 may include a spot inspection or a roadside inspection. This scenario is explained further below in FIG. 1B. In one embodiment, inspection 120 may be carried out at an inspection station 122. In one embodiment, the inspection station 122 is a weigh station. As illustrated in FIG. 1B, the AV 602 is pulled into an inspection station 122 to be inspected.

Generally, the inspection station 122 is a place where vehicles including the AV 602 may be asked to pull into to be inspected by a second user 140b. For example, assume that while the AV 602 was driving on a road, sensors 646 detect one or more indications indicating that the AV 602 is asked to pull into the inspection station 122. For example, the sensors 646 may capture the presence of an inspection road sign ahead of the AV 602. As such, the sensor data 310 may include one or more of an image feed, video feed, LiDAR feed, etc. indicating the inspection road sign.

In another example, the sensor data 310 related to inspection 120 may include a signal that is received by an application (and/or a transponder) that is installed in the AV 602 indicating to pull into the inspection station 122. The application (and/or transponder) is in signal communication with the systems of the AV 602 and the inspection station 122, and can receive signals indicating that the AV 602 is requested to pull into the inspection station 122 or that an inspection of the AV 602 is not requested and the AV 602 may bypass the inspection 120 at the inspection station 122. When the sensors 646 receives one or more indications to pull into the inspection station 122, the AV 602 may follow those indications and pull into the inspection station 122. In such cases, the second user 140b may provide an inspection assist 124 to address (and resolve) the inspection 120.

For initiating the inspection 120, the second user 140b may initiate a communication with the operation server 400 (see FIG. 2) from their electronic device 150 and provide the inspection assist 124 upon being authenticated. During the inspection 120, the second user 140b may request particular information regarding the AV 602. In a particular example, the particular information may be according to road safety regulation rules. This scenario is explained in detail in conjunction with FIG. 2.

In one embodiment, the inspection 120 may include a spot inspection or a roadside inspection. For example, assume that while the AV 602 is driving on a road, the AV 602 reaches a spot/roadside inspection point. As such, the sensors 646 detect one or more indications that the AV 602 is reaching the spot inspection point, for example, by detecting the presence of an inspection road sign, a user 140b (ahead of the AV 602) holding an inspection stop sign, etc. As such, the control subsystem 300 pulls the AV 602 over at the inspection stop point. Indications that the AV 602 is requested to pull into the inspection station 122 may include a fixed road sign, a lighted marquee, a changeable sign, a radio signal, an audio signal, and the like.

Example Report Request

FIG. 1C illustrates a simplified schematic diagram of an unexpected event 100, where the unexpected event 100 comprises a report request 130 from a third user 140c (e.g., a law enforcement officer). For example, assume that the AV 602 was driving on a road 132, and the third user 140c flagged the AV 602 to provide a status report 134 of one or more aspects of the AV 602. In some examples, the status report 134 may be related to a driving history of the AV 602, health diagnostics of the AV 602, among others.

In a first example, assume that the status report 134 is related to the driving history of the AV 602. In this particular example, assume that while the AV 602 was driving on the road 132, the third user 140c may have assumed that the AV 602 is speeding over a speed limit of the road 132 and flagged the AV 602 to pull over. The third user 140c may flag the AV 602 to pull over by one or more methods including turning on the sirens of their vehicle, instructing to pull over from a speaker, turning on the beacons and flashing lights of their vehicle, etc. The sensors 646 can detect these indications and generate sensor data 310 corresponding to those indications.

For example, in such cases, the sensor data 310 may include one or more indications that the AV 602 is being flagged by the third user 140c, such as audio feeds of the sirens, audio feeds of the instructions to pull over from the speaker, image feeds of the beacons and/or flashing lights, etc. In response to detecting one or more of these indications, the AV 602 is pulled over by the control subsystem 300. Once the AV 602 is pulled over, the third user 140c may initiate a communication with the operation server 400 from their electronic device 150 and request for the driving history of the AV 602.

In a second example, assume that the report request 130 is related to the health diagnostics of the AV 602. In this particular example, assume that while the AV 602 was driving on the road 132, the third user 140c may have observed a malfunction of a component of the AV 602, such as smoke coming out of a brake of the AV 602, etc. The third user 140c may initiate a communication with the operation server 400 from their electronic device 150 and request to receive the health diagnostics report of the AV 602. This scenario is explained in detail further below in conjunction with FIG. 2.

Each of the users 140a-c may generally be any person who is pre-registered with the operation server 400 (see FIG. 4) to obtain credentials to access particular information regarding the AV 602. For example, users 140a-c may include law enforcement officers, emergency personnel, mechanics, technicians, roadside assistance personnel, tow-truck operators, or other appropriate individuals who are pre-registered with the operation server 400.

Electronic device 150 may be any computing device that is configured to receive data from and transmit data to other computing devices, such as the operation server 400, the control subsystem 300, etc. (see FIG. 2). The electronic device 150 is capable of communicating with users 140, for example, via user interfaces. Examples of the electronic device 150 include but are not limited to a mobile phone, a laptop, a tablet, etc. The electronic device 150 is associated with the user 140, meaning that the user 140 uses the electronic device 150 to communicate with other devices, such as the operation server 400 as described above.

Example System for Coordinating with a User at the AV to Resolve an Unexpected Event Involving the AV FIG. 2 illustrates an exemplary embodiment of a system 200 for coordinating with a user 140 at the AV 602 to resolve an unexpected event 100 involving the AV 602. System 200 comprises the AV 602 and its components (such as the control subsystem 300) and the operation server 400. It further includes the electronic device 150, a remote operator 216, and a network 232 that provides a communication path for all of the illustrated components of system 200 to communicate with each other. The system 200 may be configured as shown or any other suitable configurations.

In general, the system 200 detects an unexpected event 100 involving the AV 602 at the operation server 400, receives a request from a user 140 at the AV 602 to address the unexpected event 100, and provides particular information and/or instructions to be forwarded to the user 140 to address (and perhaps resolve) the unexpected event 100.

As described above in FIGS. 1A to 1C, the control subsystem 300 is configured to navigate the AV 602 to travel in a safe pathway that is free of objects/obstacles. To this end, the control subsystem 300 receives sensor data 310 captured by sensors 646 of the AV 602. The control subsystem 300 is in signal communication with the operation server 400. The control subsystem 300 is configured to communicate the sensor data 310 to the operation server 400, for example, via network 232. The control subsystem 300 may communicate the sensor data 310 to the operation server 400 periodically (e.g., every minute, every few minutes, or any other suitable interval), continuously, and/or upon receiving a request from the operation server 400 to send sensor data 310. See the corresponding description of FIG. 3 for further description of the control sub system 300.

The sensor data 310 may include location coordinates 202 of the AV 602. The sensor data 310 may further include data describing the environment surrounding the AV 602, such as image feed, video feed, LiDAR data feed, and other data captured from the fields of view of the sensors 646.

Operation server 400 is generally configured to oversee the operations of the AV 602. The operation server 400 is in signal communication with the AV 602 and its components. See the corresponding description of FIG. 4 for a further description of the operation server 400. In brief, the operation server 400 comprises a processor 402 that is operably coupled with a memory 404. The processor 402 may include one or more processing units that perform various functions as described herein. The memory 404 stores any data and/or instructions used by the processor 402 to perform its functions. For example, the memory 404 stores software instructions 410 that when executed by the processor 402 causes the operation server 400 to perform one or more functions described herein. The operation server 400 may include one or more computing devices, such as servers that serve to perform functions of the operation server 400. In one embodiment, the operation server 400 may be implemented in a cluster of servers where distributed computing or cloud computing is applied. The memory 404 may include one or more of a local database, cloud database, Network-attached storage (NAS), etc.

The operation server 400 is configured to receive the sensor data 310 from the control subsystem 300, analyze the sensor data 310 and, in response, detect any of the unexpected events 100, such as accident 110, inspection 120, and report request 130 described in FIGS. 1A to 1C.

In one embodiment, the operation server 400 may analyze the sensor data 310 by implementing object detection machine learning modules 420. See FIG. 4 for a further description of the object detection machine learning modules 420. In brief, the object detection machine learning modules 420 may be implemented using neural networks and/or machine learning algorithms for detecting objects from images, videos, infrared images, point clouds, radar data, etc.

Initiating Communication with the Operation Server

In one embodiment, assume that the AV 602 has been involved in an unexpected event 100 and the user 140 has arrived at the scene. Also, assume that the user 140 wishes to assist the AV 602 to address the unexpected event 100. In order for the user 140 to address the unexpected event 100, the user 140 may require particular information regarding the AV 602. To obtain the particular information, the user 140 may initiate a communication with the operation server 400 from their electronic device 150. In one embodiment, the user 140 may call a phone number previously provided to the user 140 to initiate the communication with the operation server 400. In a particular embodiment, the user 140 may use an application 204 that is installed on the electronic device 150 to initiate the communication with the operation server 400.

Application 204 is a software/mobile/web application that is generally configured to establish a communication with the operation server 400, and receive data from and transfer data to the operation server 400. The application 204 may include user interfaces to interact with the user 140. The user 140 may login to their account on the application 204 using their login credentials 206.

As discussed in FIG. 1A-1C, the user 140 is an individual who is pre-registered with the operation server 400 in order to be authorized to access particular information regarding the AV 602. For example, the user 140 may previously have gone through a registration process with the operation server 400 and received login credentials 206 to access particular information regarding the AV 602 from the application 204. As such, the operation server 400 may keep a record of the login credentials 206 associated with the user 140 (in memory 404) in order to authenticate the user 140 in their logins to the application 204.

In one embodiment, the application 204 may be associated with the operation server 400. In another embodiment, the application 204 may be a third-party application 204 that is associated with a third-party organization. In a particular example, the third-party application 204 may be associated and in signal communication with the inspection stations 122 (see FIG. 1) as well as the operation server 400.

When the user 140 logs into the application 204 (using their login credentials 206) and initiates the communication with the operation server 400, the operation server 400 authenticates the user 140, for example, by comparing the login credentials 206 associated with the user 140 with login credentials (of a plurality of users 140) that are stored in the memory 404. If a match is found, the user 140 is authenticated and the communication with the operation server 400 is established.

When the communication with the operation server 400 is established, the user 140 may send a message 208 to the operation server 400 from the application 204. For example, the message 208 may include a request 210 to access particular information 220 regarding the AV 602 and location data 212 of the user 140. The location data 212 of the user 140 may correspond to Global Positioning System (GPS) coordinates of the electronic device 150.

Upon receiving the message 208, the operation server 400 may determine whether the location coordinates 202 of the AV 602 match the location data 212 of the user 140. In response to determining that the location coordinates 202 of the AV 602 match the location data 212 of the user 140, the operation server 400 associates the AV 602 to the user 140. As such, the operation server 400 determines that the user 140 is at the scene of the unexpected event 100 involving the AV 602 by determining that the location coordinates 202 correspond to or match and location data 212.

The operation server 400 generates a ticket 214 for the unexpected event 100 to record events that will be carried out to address (and perhaps resolve) the unexpected event 100.

The operation server 400 establishes a communication path 218 between the user 140 and a remote operator 216. The remote operator 216 may be an individual who is associated with and has access to the operation server 400. For example, the remote operator 216 may be an administrator that can access and view the information regarding the AV 602, such as sensor data 310 and other information that is available on the memory 404. In one example, the remote operator 216 may access the operation server 400 from an application server 430 that is acting as a presentation layer via the network 232. See FIG. 4 for a further description of the application server 430. In another example, the remote operator 216 may directly access the operation server 400 via user interfaces associated with the operation server 400.

In one embodiment, the communication path 218 may follow a two-way communication protocol, where data can be transmitted and received from both sides. The communication path 218 is configured to support voice-based communication, message-based communication, and/or any other appropriate communication. Using voice-based communication, the user 140 and the remote operator 216 can converse with one another. Using message-based communication, each of the user 140 and the remote operator 216 can send and receive messages, such as text, images, videos, or any other type of data.

As discussed above, the particular information 220 comprises information that the operation server 400 communicates to the user 140 so that the user 140 is able to assist the AV 602 and address the unexpected event 100. The corresponding description below describes various particular information 220 for each unexpected event 100. In one embodiment, the operation server 400 may communicate the particular information 220 to the user 140. In one embodiment, the operation server 400 may provide the particular information 220 to the remote operator 216 to forward to the electronic device 150 (to the user 140). The remote operator 216 may confirm (or update) the particular information 220 before communicating the particular information 220 to the electronic device 150. The user 140 can view the particular information 220 (e.g., on the application 204), and send a request to provide assistance 222 to address (and perhaps resolve) the unexpected event 100. Similar to the particular information 220, assistance 222 may also be different for each case of an unexpected event 100. For example, the assistance 222 may include an emergency assist 114 (for a case of accident 110 described in FIG. 1A), an inspection assist 124 (for a case of inspection 120 described in FIG. 1B), and reporting assist/report 134 (for a case of report request 130 described in FIG. 1C). These scenarios are described below.

Example Particular Information to Address an Accident

Referring back to FIG. 1A, in a case where the unexpected event 100 comprises the accident 110, the particular information 220 may include data related to the accident 110, such as sensor data 310 captured by the sensors 646 in a particular time range in which the accident 110 has occurred. The particular information 220 (see FIG. 2) may include one or more particular data formats of the sensor data 310 in the particular range, such as image feeds, video feeds, LiDAR feeds, among others.

The user 140 may specify the one or more particular data formats of the sensor data 310 to be included in the particular information 220. For example, the user 140 may specify image feeds and/or video feeds captured by the sensors 646 from two minutes before the occurrence of the accident 110 till three minutes after the occurrence of the accident 110. As such, the operation server 400 determines the timestamp of the occurrence of the accident 110 from the sensor data 310, pulls sensor data 310 in the particular time range from memory 404, and provides that to the remote operator 216 to forward to the electronic device 150, e.g., at the application 204 (see FIG. 2).

In another example, in a case where the AV 602 is involved in accident 110, the particular information 220 may include one or more of speed information (e.g., accelerometer readings), steering information, brake information, engine speed (Revolutions Per Minute (RPM)) associated with the AV 602 in a particular range in which the accident 110 has occurred.

In another example, in a case where the AV 602 is involved in the accident 110, the particular information 220 may include the health diagnostics report of the AV 602, e.g., in a particular range in which the accident 110 has occurred. Alternatively or in addition, user 140 may specify any other information associated with the AV 602 to be included in the particular information 220.

Example Assistance and Instructions to Address an Accident

Referring to FIG. 2, in the case where the AV 602 is involved in the accident 110 described in FIG. 1A, the assistance 222 to address (and perhaps resolve) the accident 110 includes an emergency assist 114. As such, the operation server 400 may provide instructions for accident 224 to the remote operator 216 to forward to the user 140 to enable them to provide the emergency assist 114.

In one embodiment, the instructions for accident 224 may include instructions for remotely granting entry to the user 140 to enter the cab of the AV 602 (upon remotely unlocking the entry door of the cab) and disengaging the autonomous operation of the AV 602. In one embodiment, disengaging the autonomous operation of the AV 602 may be performed remotely from the operation server 400. In one embodiment, disengaging the autonomous operation of the AV 602 may be performed locally by the user 140 following the instructions for accident 224.

In a particular example, the user 140 can disengage the autonomous operation of the AV 602 using an emergency stop button 604. See FIG. 6 for a further description of the emergency stop button 604. In brief, the emergency stop button 604 may include a physical button that is in signal communication with the components of the AV 602, and is configured to disconnect or disengage the autonomous functions of the AV 602 upon being activated. Once the emergency stop button 604 is activated, the AV 602 can be operated manually similar to a non-autonomous vehicle. In one embodiment, the local disengagement of the autonomous functions of the AV 602 may be carried out for an additional confirmation in addition to the remote disengagement of the autonomous function of the AV 602.

In a particular example, the user 140 may request to enter the cab of the AV 602 and locally disengage the autonomous function of the AV 602. As such, the emergency assist 114 may include the local disengagement of the autonomous function of the AV 602.

In one embodiment, the instructions for accident 224 may include instructions to manually operate the AV 602 without an ignition key. For example, when the user 140 has entered the cab of the AV 602 and disengaged the autonomous function of the AV 602, they may receive the instructions to manually operate the AV 602 without the ignition key. As such, the user 140 can drive and pull over the AV 602 to a side of the road 112.

In some cases, it may not be safe to manually operate the AV 602, for example, due to damages from the accident 110. As such, the operation server 400 may determine whether it is safe to manually operate the AV 602 based on the health diagnostics report of the AV 602. For example, upon detecting accident 110, the operation server 400 may analyze the health diagnostics of the AV 602 and determine whether it is safe to manually operate the AV 602. For example, the operation server 400 may determine that it is safe to manually operate the AV 602 if the health diagnostics report of the AV 602 indicates that the overall health of the components of the AV 602 is above a threshold percentage (e.g., above 60%, above 70%, above 80%, or any other appropriate percentage range). In response to determining that it is safe to manually operate the AV 602, the operation server 400 may provide instructions to the remote operator 216 to inform the user 140 that it is safe to manually operate the AV 602.

In response to determining that it is not safe to manually operate the AV 602, the operation server 400 may dispatch a tow truck to move the AV 602. In a particular example, the operation server 400 may also provide an estimated arrival time of the towing truck to the remote operator 216 to forward to the user 140.

In one embodiment, the operation server 400 may establish a second communication path 230 between the user 140 and the remote operator 216, where the second communication path 230 is established by a communication module associated with the AV 602. The communication module may be installed inside the cab of the AV 602. As such, the communication module may be referred to as an in-cab communication module. In other examples, the communication module may be installed at any location on the AV 602, such as on an outer body of the AV 602. The communication module may include one or more user interfaces. For example, the user interfaces may include a speaker, a microphone, and a display screen.

For example, assume that the user 140 has entered the cab of the AV 602 upon remotely being granted entry to the cab of the AV 602 as described above. Upon detecting that the user 140 has entered the cab of the AV 602, the operation server 400 may boot up the in-cab communication module, initiate, and establish the second communication path 230. The second communication path 230 may be similar to communication path 218. For example, similar to communication path 218, the second communication path 230 may follow a two-way communication protocol. The user 140 and the remote operator 216 may communicate with each other using the user interfaces of the in-cab communication module. For example, the user 140 may access and view the particular information 220 on the display screen.

In one embodiment, for the case of the AV 602 involving in accident 110 (see FIG. 1A), the emergency assist 114, the instructions for accident 224, particular information 220 that was sent to the user 140, their corresponding timestamps of communication, and the outcome of the accident 110 may be stored in the ticket 214.

Example Particular Information to Address Inspection

Referring back to FIG. 1B, in a case where the unexpected event 100 comprises the inspection 120, the particular information 220 may include an inspection checklist that may be based on road safety regulation rules. For example, the particular information 220 may include one or more of a status report of autonomous faculties of the AV 602 and a status report of the physical characteristics of the AV 602.

Figure 3:
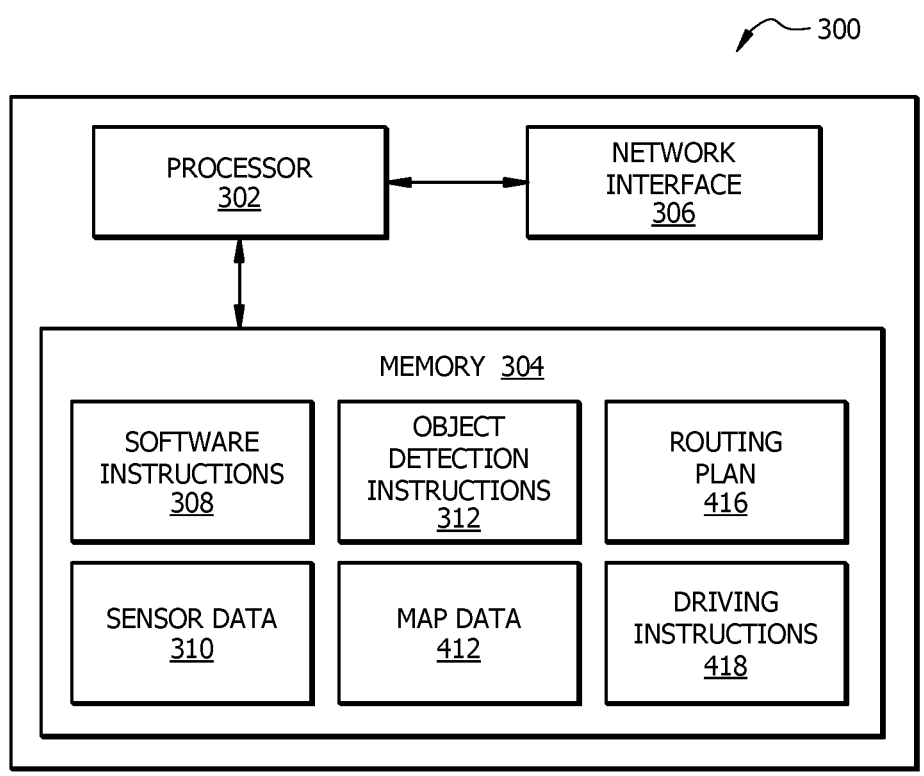
FIG. 3 illustrates a block diagram of a control subsystem of the AV illustrated in FIG. 2.

The status report of the autonomous faculties of the AV 602 may include the autonomous functions/algorithms stored in components of the AV 602, including those stored in the control subsystem 300, such as software instructions 308, sensor data 310, object detection instructions 312, map data 412, routing plans 416, and sensor functions (see FIG. 3).

The status report of the physical characteristics of the AV 602 may include one or more of the weight, cargo, temperature of the interior components, temperature of the cab, tire inflations, among other information associated with the AV 602.

The user 140b may specify one or more items listed above to be included in the particular information 220 (see FIG. 2). Alternatively or in addition, the user 140b may specify any other appropriate information associated with the AV 602 to be included in the particular information 220 (see FIG. 2).

In the case where the user 140b wishes to inspect the AV 602 (i.e., the AV 602 is involved in the inspection 120), the assistance 222 (see FIG. 2) to address (and perhaps resolve) the inspection 120 includes an inspection assist 124. Referring to FIG. 2, as such, in one embodiment, the operation server 400 may provide instructions for inspection 226 to the remote operator 216 to forward to the user 140b (see FIG. 1B, an instance of user 140 of FIG. 2) to enable them to provide the inspection assist 124. In one embodiment, the instruction for inspection 226 may include providing the inspection checklist or the particular information 220 to the user 140b (see FIG. 1B) as described above.

In one embodiment, for the case of the AV 602 involving in inspection 120 (see FIG. 1B), the inspection assist 124, instructions for inspection 226, particular information 220 that was sent to the user 140, their corresponding timestamps, and the outcome of the inspection 120 may be stored in the ticket 214.

Example Particular Information to Address Report Request

Referring back to FIG. 1C, in a case where the unexpected event 100 comprises the report request 130, the particular information 220 may include the report 134 that is requested by the user 140c. For example, the report 134 may include one or more of the driving history of the AV 602 and health diagnostics of the AV 602. For example, the user 140c may request to include a driving history of the AV 602 in a particular time range in the report 134. The driving history of the AV 602 may include one or more of accelerometer records, steering records, brake records, etc. for example, in a table format with timestamps or any other appropriate data format.

In the case of the first example described above in FIG. 1C where the user 140c has flagged the AV 602 to pull over because they assumed the AV 602 was speeding, the user 140c may request to receive the driving history of the AV 602, e.g., from two minutes before the AV 602 was pulled over till the AV 602 was pulled over. As such, the report 134 may include the driving history of the AV 602 in the requested time range.

In the case of the second example described in FIG. 1C where the user 140c observed a malfunction of a component of the AV 602 (e.g., smoke coming out of a brake of the AV 602), the user 140c may request to receive the health diagnostics of the AV 602 of that component or the general health diagnostics of the AV 602. As such, the report 134 may include the health diagnostics of the AV 602.

Referring to FIG. 2, alternatively or in addition, the user 140 may specify any other appropriate information associated with the AV 602 to be included in the report 134.

In the case where the user 140 wishes to receive the report 134 from the AV 602 (i.e., the AV 602 is involved in the report request 130), the assistance 222 to address (and perhaps resolve) the report request 130 includes reporting assist or report 134 to the user 140. In one embodiment, the operation server 400 may provide instructions for report request 228 to the remote operator 216 to forward to the user 140 to satisfy the request of the user 140 to receive the report 134.

In one embodiment, for the case of the AV 602 involving a report request 130 (see FIG. 1), the instructions for report request 228, particular information 220 that was sent to the user 140, the report 134, their corresponding timestamps of communication, and the outcome of the report request 130 may be stored in the ticket 214.

The operation server 400 determines whether the unexpected event 100 is addressed (and perhaps resolved) by determining whether the assistance 222 of the user 140 to address (and perhaps resolve) the unexpected event 100 has been accomplished and successful. In response to determining that the unexpected event 100 is addressed (and perhaps resolved), the operation server 400 closes the ticket 214.

In some embodiments, the user 140 may also transfer data to the remote operator 216 and/or the operation server 400 in providing assistance 222 to address (and perhaps resolve) the unexpected event 100. For example, in the case of the AV 602 involving an accident 110, the user 140 may capture one or more images and/or videos from the scene of the accident 110, and send those to the remote operator 216 and/or the operation server 400. The remote operator 216 may review the received images and/or videos, determine the extent of damage to the AV 602, and confirm (or update) health diagnostics of the AV 602. The remote operator 216 may also use the received images and/or videos to confirm (update) the instructions for accidents 224 for the user 140.

In some embodiments, the operation server 400 may communicate the particular information 220 to the electronic device 150 even while the AV 602 is driving. For example, while the AV 602 is driving on a road, the AV 602 may encounter a situation where it may need to account for an unplanned pullover or an unplanned re-route. These scenarios are described below.

In the case of the second example described in FIG. 1C, when the user observes a malfunction of a component of the AV 602, while the AV 602 is driving, the user 140 may initiate the communication with the operation server 400. Referring to FIG. 2, similar to as described above, once the communication path 218 is established between the user 140 and the remote operator 216, the user 140 may inform the remote operator 216 and/or the operation server 400 about the malfunction. The remote operator 216 and/or the operation server 400 may review the status of that component of the AV 602 (by accessing the operation server 400). In one example, the remote operator 216 and/or the operation server 400 may reply to the user 140 that the status of that component indicates a warning but it is fully operational, and forward a status report of that component to the user 140 (in the report 134). In another example, the remote operator 216 and/or the operation server 400 may reply to the user 140 that the status of that component indicates damage and the control subsystem 300 was already looking for a safe region to pull the AV 602 over. In this example, the user 140 may provide assistance 222 by suggesting particular location coordinates of a safe region to the remote operator 216 and/or the operation server 400 to pull the AV 602 over. The remote operator 216 and/or the operation server 400 may evaluate the suggestion of the user 140 and set (or update) the region for the control subsystem 300 to pull the AV 602 over. As such, the assistance 222 provided by the user 140 may include suggesting the safe region to pull the AV 602 over into.

In some cases, while the AV 602 is driving on a road, the AV 602 may encounter a situation where it may need to account for an unplanned re-route. For example, the AV 602 may encounter a re-route road sign, a road closure, or any other situation that would prevent the AV 602 from continuing to follow its path. In such situations, the sensors 646 detect the presence of one or more of a re-route road sign, a road closure, etc. As such, the control subsystem 300 may pull the AV 602 over, if the control subsystem 300 and/or the operation server 400 determine that it is not safe to autonomously re-route the AV 602. For example, the control subsystem 300 and/or the operation server 400 may determine that it is not safe to autonomously re-route the AV 602 if the traffic on the road is congested.

In such situations, the user 140 may approach the AV 602 and initiate a communication with the operation server 400 to provide roadside assistance 222 to the AV 602. The roadside assistance 222 may include re-routing the AV 602 to an appropriate road to reach its destination. For example, after receiving a confirmation that the AV 602 is fully operational (e.g., from the remote operator 216 and/or the operation server 400), the user 140 may be granted entry to enter the cab of the AV 602, disengage the autonomous functions of the AV 602, and manually drive the AV 602 to the appropriate road to reach its destination.

In some cases, while the AV 602 is driving on a road, the sensors 646 on the AV 602 may detect a blown tire. As such, the control subsystem 300 may pull the AV 602 over to a side of a road. A user 140 may arrive at the AV 602 and initiate a communication with the operation server 400 to provide roadside assistance 222 to the AV 602. In this case, the roadside assistance 222 may include changing the blown tire of the AV 602.

Network 232 may be any suitable type of wireless and/or wired network including, but not limited to, all or a portion of the Internet, an Intranet, a private network, a public network, a peer-to-peer network, the public switched telephone network, a cellular network, a local area network (LAN), a metropolitan area network (MAN), a wide area network (WAN), and a satellite network. The network 232 may be configured to support any suitable type of communication protocol as would be appreciated by one of ordinary skill in the art.

Example Control Subsystem

FIG. 3 illustrates an embodiment of the control subsystem 300. Aspects of one embodiment of the control subsystem 300 have been covered in descriptions of FIGS. 1A-1C and 2, and additional aspects are provided below. The control subsystem 300 includes at least one processor 302, at least one memory 304, and at least one network interface 306. The control subsystem 300 may be configured as shown or in any other suitable configuration.

Processor 302 comprises one or more processors operably coupled to the memory 304. The processor 302 is any electronic circuitry including, but not limited to, state machines, one or more central processing unit (CPU) chips, logic units, cores (e.g. a multi-core processor), field-programmable gate array (FPGAs), application-specific integrated circuits (ASICs), or digital signal processors (DSPs). The processor 302 may be a programmable logic device, a microcontroller, a microprocessor, or any suitable combination of the preceding. The processor 302 is communicatively coupled to and in signal communication with the memory 304 and the network interface 306. The one or more processors are configured to process data and may be implemented in hardware or software. For example, the processor 302 may be 8-bit, 16-bit, 32-bit, 64-bit or of any other suitable architecture. The processor 302 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute software instructions 308 to implement the functions disclosed herein, such as some or all of those described with respect to FIGS. 1, 2, and 5. In some embodiments, the function described herein is implemented using logic units, FPGAs, ASICs, DSPs, or any other suitable hardware or electronic circuitry.

Memory 304 stores any of the information described above with respect to FIGS. 1 and 2 and below with respect to FIG. 5 along with any other data, instructions, logic, rules, or code operable to implement the function(s) described herein when executed by processor 302. For example, the memory 304 may store software instructions 308, sensor data 310 received from the sensors 646 of the AV 602, obstruction detection instructions 312, map data 412, routing plan 416, driving instructions 418, and/or any other data/instructions described herein. The memory 304 comprises one or more disks, tape drives, or solid-state drives, and may be used as an over-flow data storage device, to store programs when such programs are selected for execution, and to store instructions and data that are read during program execution. The memory 304 may be volatile or non-volatile and may comprise read-only memory (ROM), random-access memory (RAM), ternary content-addressable memory (TCAM), dynamic random-access memory (DRAM), and static random-access memory (SRAM).

Network interface 306 is configured to enable wired and/or wireless communications. The network interface 306 is configured to communicate data between the control subsystem 300 and other network devices, systems, or domain(s). For example, the network interface 306 may comprise a WIFI interface, a local area network (LAN) interface, a wide area network (WAN) interface, a modem, a switch, or a router. The processor 302 is configured to send and receive data using the network interface 306. The network interface 306 may be configured to use any suitable type of communication protocol.

Figure 6:
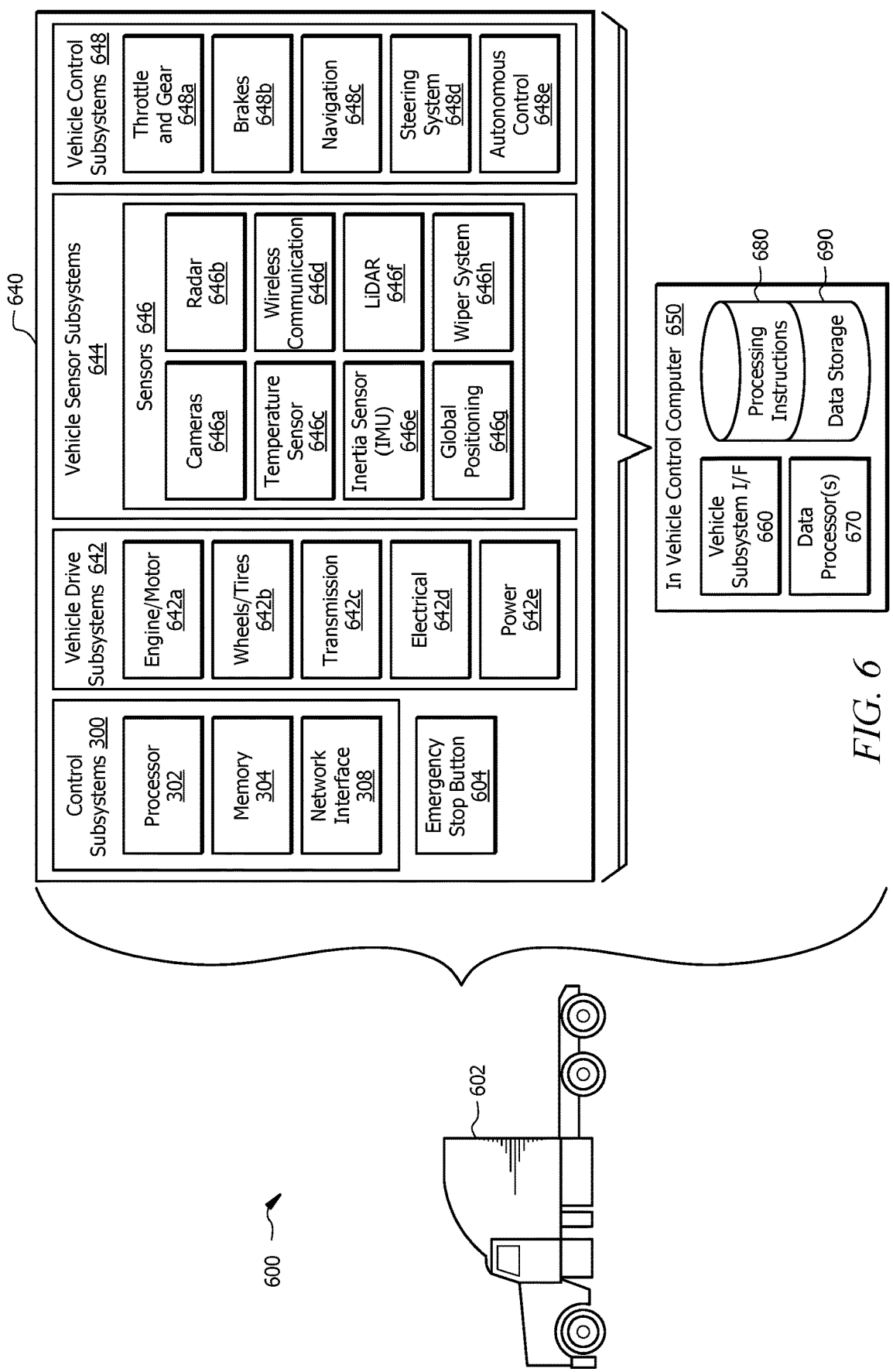
FIG. 6 illustrates a block diagram of an example autonomous vehicle configured to implement autonomous driving operations.

In one embodiment, the control subsystem 300 may be a subsystem of the in-vehicle control computer system 650 (see FIG. 6). The control subsystem 300 may be implemented by one or more computing devices that may serve to determine a traveling pathway free of objects/obstacles for the AV 602. For example, the one or more computing devices may implement computing systems to facilitate detecting objects surrounding the AV 602. The control subsystem 300 is in signal communication with the in-vehicle control computer system 650 (and its components) and the operation server 400.

To determine a traveling pathway for the AV 602, the control subsystem 300 receives the sensor data 310 from the sensors 646 of the AV 602. The control subsystem 300 then compares the received sensor data 310 with a portion of the map data 412 that covers the detection zones of the sensors 646. Some examples of sensors 646 are described in FIG. 6. The control subsystem 300 may use the obstruction detection instructions 312 to detect those objects and their characteristics.

The obstruction detection instructions 312 may be implemented by the processor 302 executing software instructions 308, and is generally configured to detect objects and their characteristics, such as their identification (e.g., a vehicle, an animal, a person, a tree, a traffic light, etc.), and speed, among other characteristics. The obstruction detection instructions 312 may be implemented using neural networks and/or machine learning algorithms for detecting objects from images, videos, infrared images, point clouds, Radar data, etc. For example, if the sensors 646 include cameras, the sensor data 310 may include images and/or videos of the environment surrounding the AV 602 (i.e., the detection zones of the sensors 646). In such cases, the control subsystem 300 may employ obstruction detection instructions 312 which include functions for detecting objects in the images and/or videos and determining whether there is any object within the detection zones of the sensors 646.

The obstruction detection instructions 312 may include code to employ object detection techniques to identify objects from the images and/or videos, such as an object that is a vehicle, a road sign, a lane marking, a pedestrian, a construction vehicle, a delineator, etc. If the control subsystem 300 detects an object within the detection zones of the cameras, the control subsystem 300 (in signal communication with the in-vehicle control computer system 650) may employ image based object detection module 718 to determine characteristics of that object, such as its location coordinates, speed, trajectory, among other characteristics (See the description of the image based object detection module 718 in FIG. 7). For example, if the sensors 646 include LiDAR sensors, the sensor data 310 may include distance measurements. For example, the distance measurements may include a distance traveled by an object (i.e., a displacement of an object), distances of an object from a LiDAR sensor at different times (t), etc.

In another example, the sensor data 310 from LiDAR sensors may include a cloud of point data representing obstacles or objects, which have been hit by the laser (e.g., radio wave), within the environment surrounding the AV 602 (i.e., the detection zones of the sensors 646). The cloud of point data may include points corresponding to light emitted from the LiDAR sensors and reflected from objects within the environment surrounding the AV 602. The time delay between the transmitted light and the reflected light bounced off an object corresponds to the distance between the LiDAR sensor and that object. The intensity of the reflected light bounced off an object may be indicative of a surface type of that object, e.g., a metal, skin, plastic, fabric, concrete, etc. As such, the control subsystem 300 (via obstruction detection instructions 312) may identify that object.

In one embodiment, the control subsystem 300 may use obstruction detection instructions 312 for detecting objects within the detections zones of the sensors 646. The control subsystem 300 may use the obstruction detection instructions 312 to determine if an object is detected in the sensor data 310 (e.g., in image/video feeds, LiDAR data feeds, motion sensor data feeds, infrared data feeds, etc.) received from the sensors 646. For example, the obstruction detection instructions 312 may include code for implementing object detection methods from the feed of images corresponding to frames of videos (e.g., detecting objects within detections zones of the sensors 646 from videos). Similarly, the obstruction detection instructions 312 may include code for detecting objects from LiDAR data, motion sensor data (e.g., detecting motions of the objects within the detections zones of the sensors 646), sounds (e.g., detecting sounds near the AV 602), and infrared data (e.g., detecting objects within the detections zones of the sensors 646 in infrared images). The obstruction detection instructions 312 may include code for detecting objects using other data types as well.

In one embodiment, the obstruction detection instructions 312 may include object classification techniques to determine to which class each detected object belongs. For example, the object classification techniques may be trained to classify objects based on their features, such as their geometries, sizes, speeds, among features other. As such, the object classification techniques may classify objects with common features in one class. In one embodiment, the object classification techniques may be trained by a training dataset of data types representing objects, such as in images, videos, LiDAR data, radar, motion data, etc.

For example, the obstruction detection instructions 312 may include code to employ object detection techniques to identify objects from the distance measurements and/or a cloud of point data. The control subsystem 300 may employ obstruction detection instructions 312 which include functions for detecting objects based on characteristics and/or changes in the distance measurements and/or a cloud of point data, and determining whether there is any object within the detection zones of the sensors 646. If the control subsystem 300 detects an object within the detection zones of the LiDAR sensors, the control subsystem 300 (in signal communication with the in-vehicle control computer system 650) may employ LiDAR based object detection module 712 to determine location coordinates, speed, trajectory, among other characteristics of that object (see the description of the LiDAR based object detection module 712 in FIG. 7).

In another example, if the sensors 646 include motion sensors, the sensor data 310 may include motion measurements. For example, the motion measurements may include the motion of an object from a first location to a second location. In such cases, the control subsystem 300 may employ obstruction detection instructions 312 which include functions for detecting objects based on characteristics and/or changes in the motion measurements and determining whether there is any object within the detection zones of the sensors 646. For example, changes in motions measured by a motion sensor may indicate the presence of an object within the detection zone of the sensors 646, and the direction of movement of that object. As such, the control subsystem 300 may determine whether an object is moving towards the AV 602 (e.g., a vehicle on the opposite side of a road), away from the AV 602 (e.g., a vehicle speeding ahead of the AV 602), across the AV 602 (e.g., a pedestrian crossing the road), etc.

While certain examples of the detection of objects are described above, it should be understood that any other appropriate method of object detection may be used by the control subsystem 300. In some embodiments, the control subsystem 300 may use two or more types of sensor data to determine whether an object is detected (e.g., by combining camera images, LiDAR data, and Radar data as described with respect to the sensor fusion module 702 of FIG. 7). In other words, the obstruction detection instructions 312 may include instructions, rules, and/or code for implementing any of the modules as described with respect to FIG. 7.

If the control subsystem 300 detects a distance of an object from the AV 602 is getting close to a configurable threshold distance (e.g., 200 feet, 250 feet, or any other appropriate distance), the control subsystem 300 sends signals to the in-vehicle control computer system 650 (see FIG. 6) to navigate the AV 602 according to each case and to keep a safe distance from that object.

In one case, the control subsystem 300 may detect a distance of a stationary object from the AV 602 is getting close to a configurable threshold distance, such as a building, a stopped vehicle, a pedestrian, among other objects. In another case, the control subsystem 300 may detect that a distance of a moving object from the AV 602 is getting close to a configurable threshold distance, such as a moving vehicle, object 116 discussed in FIG. 1A, among other objects.

The control subsystem 300 may determine the configurable threshold distance based at least in part upon the allowed speed range of a road traveled by the AV 602, speed of the AV 602, and speeds of surrounding vehicles. For example, in a highway where the allowed speed range is 65-75 mph, when the AV 602 is moving with a speed of 65 mph, and the average speed of surrounding vehicles is 70 mph, the configurable threshold distance may be 300 feet.

Example Operation Server

Figure 4:
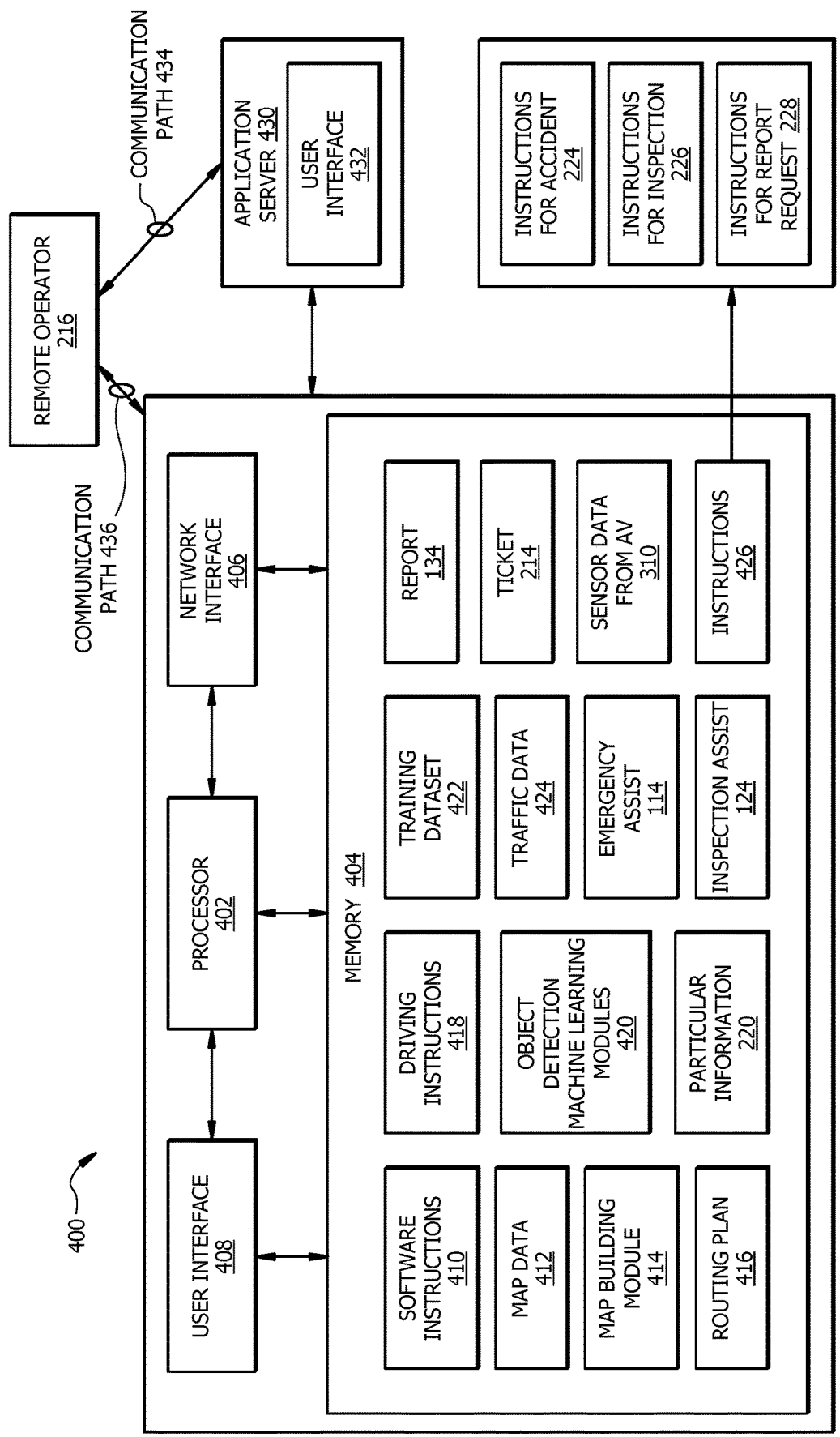
FIG. 4 illustrates a block diagram of the operation server illustrated in FIG. 2.

FIG. 4 shows an embodiment of the operation server 400. Aspects of one embodiment of the operation server 400 have been covered in descriptions of FIGS. 1A-1C and 2, and additional aspects are provided below. The operation server 400 includes at least one processor 402, at least one memory 404, and at least one network interface 406. The operation server 400 may be configured as shown or in any other suitable configuration.

Processor 402 comprises one or more processors operably coupled to the memory 404. The processor 402 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 402 may be a programmable logic device, a microcontroller, a microprocessor, or any suitable combination of the preceding. The processor 402 is communicatively coupled to and in signal communication with the memory 404, network interface 406, and user interface 408. The one or more processors are configured to process data and may be implemented in hardware or software. For example, the processor 402 may be 8-bit, 16-bit, 32-bit, 64-bit or of any other suitable architecture. The processor 402 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute software instructions 410 to implement the function disclosed herein, such as some or all of those described with respect to FIGS. 1A-1C, 2, and 5. In some embodiments, the function described herein is implemented using logic units, FPGAs, ASICs, DSPs, or any other suitable hardware or electronic circuitry.

Memory 404 stores any of the information described above with respect to FIGS. 1A-1C and 2 and below with respect to FIG. 5 along with any other data, instructions, logic, rules, or code operable to implement the function(s) described herein when executed by processor 402. For example, the memory 404 may store software instructions 410, map data 412, map building module 414, routing plan 416, driving instructions 418, object detection machine learning modules 420, training dataset 422, traffic data 424, emergency assist 114, inspection assist 124, report 134, ticket 214, particular information 220, sensor data 310 received from the AV 602, and/or any other data/instructions. The software instructions 410 include code that when executed by the processor 402 causes the operation server 400 to perform the functions described herein, such as some or all of those described in FIGS. 1, 2, and 5. The memory 404 further stores instructions 426 that are forwarded to the user 140 to address different cases of unexpected events 110 as described in FIGS. 1A-1C, 2, and 5. Instructions 426 may include instructions for accident 224, instructions for inspection 226, instructions for report request 228, and/or any other data/instructions. Instructions 426 are laid out by the remote operator 216 to coordinate with a user 140 to address each unexpected event 100. The memory 404 comprises one or more disks, tape drives, or solid-state drives, and may be used as an over-flow data storage device, to store programs when such programs are selected for execution, and to store instructions and data that are read during program execution. The memory 404 may be volatile or non-volatile and may comprise read-only memory (ROM), random-access memory (RAM), ternary content-addressable memory (TCAM), dynamic random-access memory (DRAM), and static random-access memory (SRAM).

Network interface 406 is configured to enable wired and/or wireless communications. The network interface 406 is configured to communicate data between the control subsystem 300 and other network devices, systems, or domain(s). For example, the network interface 406 may comprise a WIFI interface, a local area network (LAN) interface, a wide area network (WAN) interface, a modem, a switch, or a router. The processor 402 is configured to send and receive data using the network interface 406. The network interface 406 may be configured to use any suitable type of communication protocol.

User interfaces 408 may include one or more user interfaces that are configured to interact with users, such as the remote operator 216. For example, the user interface 408 may include peripherals of the operation server 400, such as monitors, keyboards, one or more computer mice, trackpads, touchpads, etc. The remote operator 216 may use the user interfaces 408 to access the memory 404 to forward data/instruction to the user 140 to address an unexpected event 100, such as any of the instructions 426, particular information 220, sensor data 310 (e.g., in a particular time range), among others, similar to that described in FIG. 2. In one embodiment, the remote operator 216 may confirm (or update) any of the instructions 426 and particular information 220 before communicating those to the user 140, similar to that described in FIG. 2. In one embodiment, the process of communicating instructions 426 to the user 140 may be computerized and performed by the operation server 400.

In one embodiment, the operation server 400 may be implemented by a cluster of computing devices that may serve to oversee the operations of the AV 602. For example, the operation server 400 may be implemented by a plurality of computing devices using distributed computing and/or cloud computing systems. In another example, the operation server 400 may be implemented by a plurality of computing devices in one or more data centers. As such, in one embodiment, the operation server 400 may include more processing power than the control subsystem 300. The operation server 400 is in signal communication with one or more AVs 602 and their components (e.g., the in-vehicle control computer 650). In one embodiment, the operation server 400 is configured to determine a particular routing plan 416 for the AV 602. For example, the operation server 400 may determine a particular routing plan 416 for an AV 602 that leads to reduced driving time and a safer driving experience for reaching the destination of that AV 602.

In one embodiment, in cases where an AV 602 encounters a re-route road sign or a road closure, the operation server 400 may evaluate sensor data 310 and map data 412, and determine that it is not safe to autonomously conduct re-routing the AV 602. In one example, the operation server 400 may determine that it is not sate to autonomously conduct re-routing the AV 602 when the sensor data indicates a congested traffic. As such, the operation server 400 may send instructions to the AV 602 to pull over to a side of the road. In one embodiment, the remote operator 216 may confirm, modify, and/or override the suggested navigation plan of the operation server 400 as described below.

In one embodiment, the navigating solutions or routing plans 416 for the AV 602 may be determined from Vehicle-to-Vehicle (V2V) communications, such as one AV 602 with another. In one embodiment, the navigating solutions or routing plans 416 for the AV 602 may be determined from Vehicle-to-Cloud (V2C) communications, such as the AV 602 with the operation server 400.

In one embodiment, the navigating solutions or routing plans 416 for the AV 602 may be determined by Vehicle-to-Cloud-to-Human (V2C2H) and/or Vehicle-to-Human (V2H) communications, where human intervention is incorporated in determining navigating solutions for the AV 602. For example, the remote operator 216 may review the sensor data 310 from the user interface 408 and confirm, modify, and/or override navigating solutions for the AV 602 determined by the control subsystem 300 and/or the operation server 400. The remote operator 216 may add a human perspective in determining the navigation plan of the AV 602 that the control subsystem 300 and/or the operation server 400 otherwise do not have the human perspective which is more preferable compared to machine's perspectives in terms of safety, fuel-saving, etc.

In one embodiment, the navigating solutions for the AV 602 may be determined by any combination of V2V, V2C, V2C2H, V2H communications, among other types of communications.

As illustrated in FIG. 3, the remote operator 216 can access the application server 430 via communication path 434, and similarly, access the operation server 400 via communication path 436. In one embodiment, the operation server 400 may send the sensor data 310, instructions 426, particular information 220, and/or any other data/instructions to an application server 430 to be reviewed by the remote operator 216. As such, in one embodiment, the remote operator 216 can remotely access the operation server 400 via the application server 430. The application server 430 is generally any computing device configured to communicate with other devices, such as other servers (e.g., operation server 400), AV 602, databases, etc., via a network interface. The application server 430 is configured to perform specific functions described herein and interact with remote operator 216, e.g., via its user interfaces 432 and communication path 434. Examples of the application server 430 include but are not limited to desktop computers, laptop computers, servers, etc. In one example, the application server 430 may act as a presentation layer where remote operator 216 access the operation server 400. As such, the operation server 400 may send sensor data 310, instructions 426, particular information 220, and/or any other data/instructions to the application server 430. The remote operator 216, after establishing the communication path 434 with the application server 430, may review the received data from the user interface 432 and confirm, modify, and/or override any of the instructions 426 and particular information 220 before communicating to the user 140, similar to that described in FIG. 2. In another embodiment, the remote operator 216 can directly access the operation server 400, and after establishing the communication path 436 with the operation server 400, may confirm, modify, and/or override any of the instructions 426 and particular information 220 before communicating to the user 140. The remote operator 216 may also confirm, modify, and/or override navigating solutions for the AV 602 determined by the control subsystem 300 and/or the operation server 400, such as described above.

Map data 412 may include a virtual map of a city which includes roads 112, 132, and inspection station 122 (see FIG. 1). In some examples, the map data 412 may include the map database 758 and map database 736 (see FIG. 7 for descriptions of the map database 758 and map database 736). The map data 412 may include drivable areas, such as roads, paths, highways, and undrivable areas, such as terrain (determined by the occupancy grid module 760, see FIG. 7 for descriptions of the occupancy grid module 760). The map data 412 may specify location coordinates of road signs, lanes, lane markings, lane boundaries, road boundaries, traffic lights, etc.

The map data 412 may also specify connections between lanes (e.g., which lanes can feed into other adjacent lanes). The map data 412 may specify information indicating types of lanes of a road (e.g., traffic lane, passing lane, emergency lane, turning lane, bus lane, etc.), types of lane boundaries (e.g., white lines, yellow lines, other road surface markings and/or mechanical markings, etc.), types of road boundaries (e.g., regular curbs, red curbs, sidewalks, guard rails, other barriers, etc.) road intersections, one or more obstacles ahead of the autonomous vehicle, and other information about the road or areas adjacent to the road.

The map data 412 may include information about elevations of the roads and grade of the roads (i.e., its incline, decline, slop). For example, the map data 412 may specify elevations of roads, such as curves, hills, valleys; road hazards, such as speed bumps, potholes; road sections, such as road school zones, railroad crossings, etc. For example, if a section of a road is perfectly flat and level, then the map data 412 would specify that the grade along that section is zero. The map data 412 may include elevation of different segments of the roads, such as hills, valleys, curves, etc., among other information. This information may be used to determine shifting to proper gear, such as shifting to high gear in an uphill road and shifting to low gear in a downhill road. As such, by detecting the elevation change in a road, proper gear shifting may be applied, thereby saving fuel of the AV 602, increasing longevity of the vehicle drive subsystems 642 of the AVs 602, i.e., engines 642a, tires 642b, transmission components 642c, electrical components 642d, and power sources 642e. In one embodiment, if the control subsystem 300 of an AV 602 determines that a grade of a road is more than a threshold elevation change (e.g., 7%), it may determine that it is not safe for the AV 602 to drive in that road.

Map building module 414 may be implemented by the processor 402 executing software instructions 410, is configured to build the map data 412. In one embodiment, the map building module 414 may build the map data 412 from sensor data received from one or more mapping vehicles. In one example, a mapping vehicle may be an AV 602. In another example, a mapping vehicle may be an AV 602 or un-autonomous vehicle connected or integrated with sensors 646 operated by a driver.

The map building module 414 is configured to use the sensor data to determine which portion of the map data 412 they are associated with. The map building module 414 may dynamically build each section of the map data 412 by merging different sensor data associated with each section of the map data 412. The map building module 414 also uses the sensor data to discover overlapping portions of the map data 412 (e.g., by matching corresponding images, videos, LiDAR data, Radar data, etc. observing the same portion of the map data 412). The map building module 414 then connects portions of the map data 412 with their corresponding adjacent portions. In other words, the map building module 414 discovers adjacent portions of the map data 412, stitches them together, and builds the map data 412. The map building module 414 is also configured to update a portion of the map data 412 that based on the received sensor data needs to be updated.

Routing plan 416 is a plan for traveling from a start location (e.g., a first AV launchpad/landing pad) to a destination (e.g., a second AV launchpad/landing pad). For example, the routing plan 416 of the AV 602 may specify a combination of one or more streets/roads/highways in a specific order from the start location to the destination. The routing plan 416 of the AV 602 may specify stages including the first stage (e.g., moving out from the start location), a plurality of intermediate stages (e.g., traveling along particular lanes of one or more particular street/road/highway), and the last stage (e.g., entering the destination). The routing plan 416 may include other information about the route from the start position to the destination, such as road/traffic signs in that routing plan 416, etc.

Figure 7:
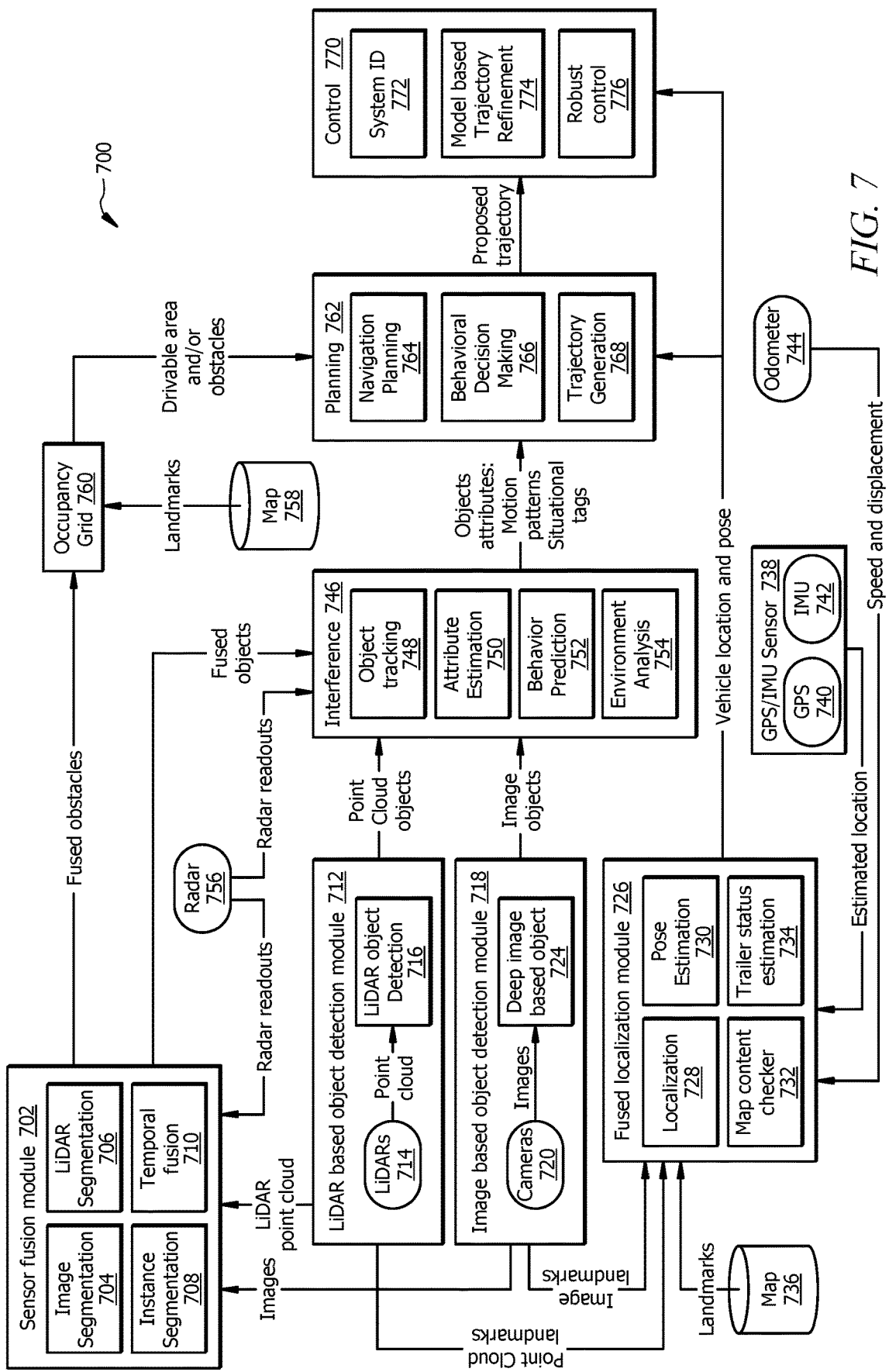
FIG. 7 illustrates an example system for providing autonomous driving operations used by the AV of FIG. 6.

Driving instructions 418 may be implemented by the planning module 762 (See descriptions of the planning module 762 in FIG. 7). The driving instructions 418 may include instructions and rules to adapt the autonomous driving of the AV 602 according to the driving rules of each stage of the routing plan 416. For example, the driving instructions 418 may include instructions to stay within the speed range of a road traveled by the AV 602, adapt the speed of the AV 602 with respect to observed changes by the sensors 646, such as speeds of surrounding vehicles, objects within the detection zones of the sensors, etc.

Object detection machine learning modules 420 may be implemented by the processor 402 executing software instructions 410, and is generally configured to detect objects from the sensor data 310. The object detection machine learning modules 420 may be implemented using neural networks and/or machine learning algorithms for detecting objects from any data type, such as images, videos, infrared images, point clouds, Radar data, etc.

In one embodiment, the object detection machine learning modules 420 may be implemented using machine learning algorithms, such as Support Vector Machine (SVM), Naive Bayes, Logistic Regression, k-Nearest Neighbors, Decision trees, or the like. In one embodiment, the object detection machine learning modules 420 may utilize a plurality of neural network layers, convolutional neural network layers, and/or the like, in which weights and biases of perceptrons of these layers are optimized in the training process of the object detection machine learning modules 420. The object detection machine learning modules 420 may be trained by the training dataset 422 which includes samples of data types labeled with one or more objects in each sample. For example, the training dataset 422 may include sample images of objects (e.g., vehicles, lane markings, pedestrian, road signs, etc.) labeled with object(s) in each sample image. Similarly, the training dataset 422 may include samples of other data types, such as videos, infrared images, point clouds, Radar data, etc. labeled with object(s) in each sample data. The object detection machine learning modules 420 may be trained, testes, and refined by the training dataset 422 and the sensor data 310. The object detection machine learning modules 420 uses the sensor data 310 (which are not labeled with objects) to increase their accuracy of predictions in detecting objects. For example, supervised and/or unsupervised machine learning algorithms may be used to validate the predictions of the object detection machine learning modules 420 in detecting objects in the sensor data 310.

Traffic data 424 may include traffic data of roads/streets/highways in the map data 412. The operation server 400 may use traffic data 424 gathered by one or more mapping vehicles. The operation server 400 may use traffic data 424 that is captured from any source, such as crowd-sourced traffic data 424 captured from external sources, e.g., Waze® and Google Map®, live traffic reporting, etc.

Figure 5:
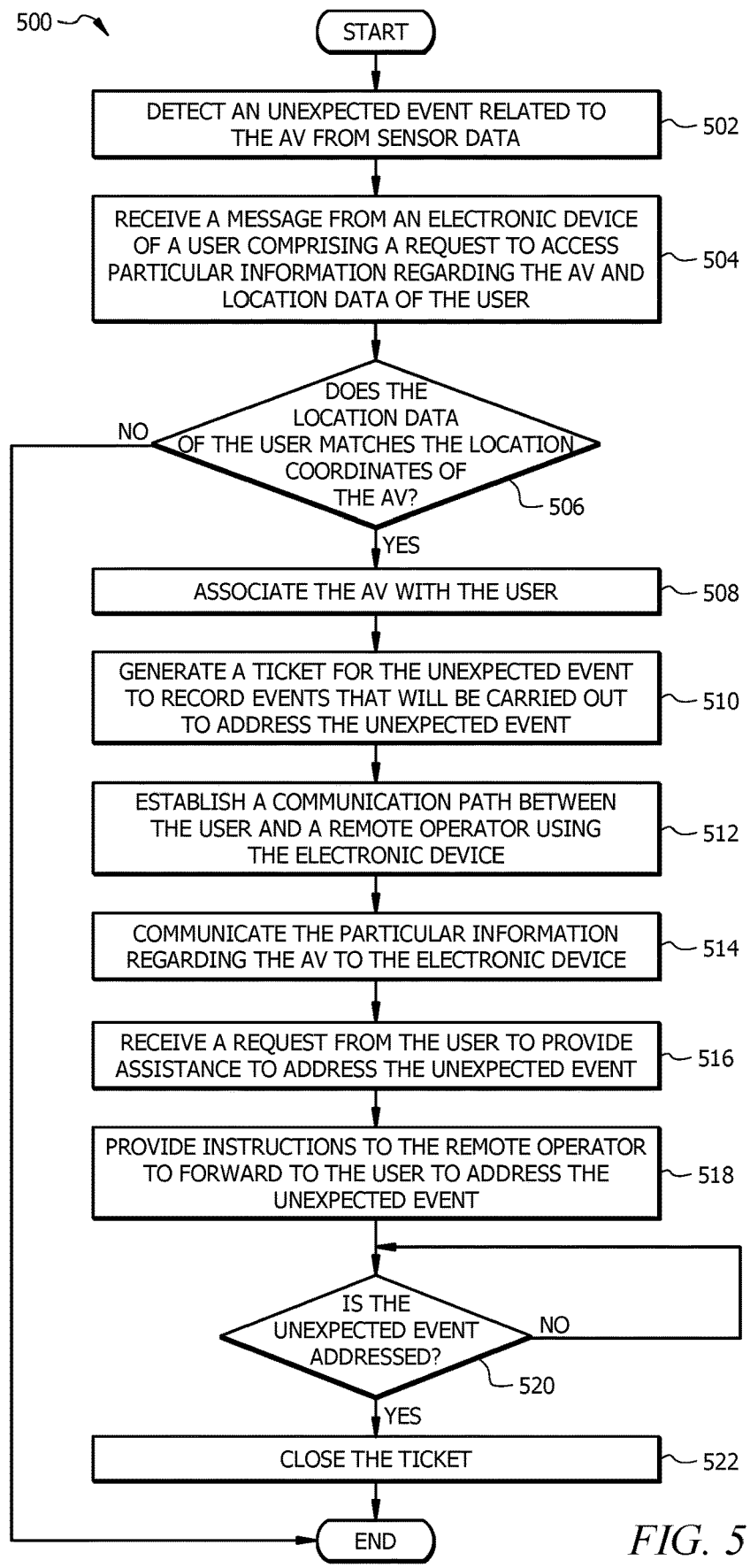
FIG. 5 illustrates an example flowchart of a method for coordinating with a user at the AV to resolve an unexpected event involving the AV.

Example Method for Coordinating with a User at the AV to Resolve an Unexpected Event Involving the AV FIG. 5 illustrates an example flowchart of a method 500 for coordinating with a user 140 at the AV 602 to resolve an unexpected event 100 involving the AV 602. Modifications, additions, or omissions may be made to method 500. Method 500 may include more, fewer, or other steps. For example, steps may be performed in parallel or in any suitable order. While at times discussed as the AV 602, operation server 400, control subsystem 300, or components of any of thereof performing steps, any suitable system or components of the system may perform one or more steps of the method 500. For example, one or more steps of method 500 may be implemented, at least in part, in the form of software instructions 308, 410, and 680, respectively from FIGS. 3, 4, and 6, stored on non-transitory, tangible, machine-readable media (e.g., memories 304, 404, 690, and 802, respectively from FIGS. 3, 4, 6, and 8) that when run by one or more processors (e.g., processors 302, 402, 670, 804, respectively from FIGS. 3, 4, 6, and 8) may cause the one or more processors to perform steps 502-522.

Method 500 begins at step 502 where the operation server 400 detects an unexpected event 100 related to the AV 602 from sensor data 310. In some examples, the unexpected event 100 related to the AV 602 may include an accident 110, an inspection 120, or a report request 130 described in FIGS. 1A to 1C.

In this process, the operation server 400 first receives the sensor data 310 from the control subsystem 300, where the sensor data 310 is captured by the one or more sensors 646 associated with the AV 602 and processed by the control subsystem 300, similar to that described above in FIGS. 1A to 3. In one example, the sensor data 310 may include location coordinates 202 of the AV 602. In another example, the sensor data 310 may include information about the environment within detection zones of the sensors 646 covering a region in front of the AV 602, such as detected objects, among others. In another example, the sensor data 310 may include information about the health status of the operation of the AV 602 and its components, such as the health status of the sensors 646, control subsystem 300, autonomous components, among other components of the AV 602.

By processing the sensor data 310, the operation server 400 may determine one or more indications indicating the unexpected event 100. In some cases, the lack of communication of sensor data 310 may be an indication that the AV 602 has been involved in the unexpected event 100. For example, due to an accident 110, communicating components of the AV 602 may be damaged, thus, an unexpected lack of communication of the sensor data 310 may be an indication that the AV 602 has been involved in accident 110.

In the case where the unexpected event 100 includes an accident 110, the sensor data 310 may indicate a decreasing distance from an object 116 in the path of the AV 602 leading to a collision with the object 116, similar to that described in FIG. 1A.

In the case where the unexpected event 100 includes an inspection 120, the sensor data 310 may indicate the presence of an inspection road sign ahead of the AV 602. In another example, in the case where the unexpected event 100 includes an inspection 120, the sensor data 310 may indicate a signal that is received by an application (and/or a transponder) that is installed in or integrated with the AV 602 indicating to pull into an inspection station 122, similar to that described in FIG. 1B.

In the cases where unexpected event 100 includes a report request 130 from a user 140, the sensor data 310 may indicate that the AV 602 is flagged by the user 140, for example, by the user 140 signaling the AV 602 using sirens among other methods, similar to that described in FIG. 1C.

At step 504, the operation server 400 receives a message 208 from an electronic device 150 associated with the user 140 comprising a request 210 to access particular information 220 regarding the AV 602 and location data 212 of the user 140. In some embodiments, the operation server 400 may authenticate the user 140 prior to receiving the message 208. For example, the operation server 400 may authenticate the user 140 by verifying their login credentials 206 when the user 140 logs in to their account on the application 204, similar to that described above in FIG. 2.

The particular information 220 regarding the AV 602 may be different for each case of unexpected events 100. For each case of unexpected event 100, particular information 220 is described in detail in FIGS. 1A-1C and 2. In the case where the AV 602 is involved in accident 110, the particular information 220 may include sensor data 310 in a particular time range in which the accident 110 has occurred. In the case where the AV 602 is requested to be inspected (i.e., the case of inspection 120), the particular information 220 may include an inspection checklist including one or more of a status report of physical characteristics of the AV 602 and a status report of autonomous faculties of the AV 602. In the case where the AV 602 is requested to provide the report 134 (i.e., the case of report request 130), the particular information 220 may include one or more of the driving history of the AV 602 and health diagnostics information of the AV 602 in a particular time range.

At step 506, the operation server 400 determines whether the location data 212 of the user 140 matches the location coordinates 202 of the AV 602. If it is determined that the location data 212 does not match the location coordinates 202, the operation server 400 determines that the user 140 is not at the sight of the AV 602, for example, is not within a threshold vicinity of the AV 602 (e.g., ten feet from the AV 602), and the method 500 is terminated. If it is determined that the location data 212 matches the location coordinates 202, the method 500 proceeds to step 508.

At step 508, the operation server 400 associates the AV 602 with the user 140. This may be an indication that the user 140 is at the sight of the AV 602, i.e., within the threshold vicinity from the AV 602.

At step 510, the operation server 400 generates a ticket 214 to record events that will be carried out to address (and perhaps resolve) the unexpected event 100.

At step 512, the operation server establishes a communication path 218 between the user 140 and the remote operator 216 using the electronic device 150. Using the communication path 218, the user 140 and the remote operator 216 may transfer any appropriate data to one another. For example, the remote operator 216 may transfer particular sensor data 310 requested by the user 140 to the user 140 (at the electronic device 150); and the user 140 may transfer one or more images and/or videos, for example of the AV 602 to the remote operator 216 (at the operation server 400).

At step 514, the operation server 400 communicates the particular information 220 regarding the AV 602 to the electronic device 150. In some embodiments, the remote operator 216 may confirm (or update) the particular information 220 before communicating the particular information 220 to the electronic device 150.

At step 516, the operation server 400 receives a request from the user 140 to provide assistance 222 to address the unexpected event 100. The request of the user 140 to provide assistance 222 for each case of unexpected events 100 may be different. Different examples of the assistance 222 for each case of unexpected events 100 are described in detail in FIG. 2.

In the case where the AV 602 is involved in the accident 110, the assistance 222 provided by the user 140 (i.e., emergency assist 114) may include local disengagement of autonomous functions of the AV 602, manually operating the AV 602 to a side of a road, among any other appropriate assistance that would lead to addressing (and resolving) the accident 110.

In the case where the AV 602 is requested to be inspected (i.e., the case of inspection 120), the assistance 222 provided by the user 140 (i.e., inspection assist 124) may include inspecting the AV 602, and confirming (or updating) the health diagnostics and status report of the physical characteristics of the AV 602, among any other appropriate assistance that would lead to addressing (and resolving) the inspection 120.

In the case where the AV 602 is requested to provide a report 134 (i.e., the case of report request 130), the assistance 222 provided by the user 140 may include confirming that the AV 602 is eligible to resume autonomous driving. In another example for this case, where user 140 observed a malfunction of a component of the AV 602, the assistance 222 may include suggesting a safe region to pull the AV 602 over. In other examples, the assistance 222 may include any other appropriate assistance that would lead to addressing (and resolving) the report request 130.

In the case where the AV 602 encountered an unplanned pullover, e.g., due to a blown tire, roadside assistance 222 may include changing the blown tire and confirming that the AV 602 is eligible to resume autonomous driving.

In the case where the AV 602 encountered an unplanned re-route, e.g., due to a road closure, a re-route road sign, roadside assistance 222 may include manually driving the AV 602 to re-route the AV 602 to a road on which the AV 602 can resume autonomous driving or driving the AV 602 to its destination.

At step 518, the operation server 400 provides instructions 426 to the remote operator 216 to forward to the user 140 to address the unexpected event 100. In some examples, instructions 426 may include instructions for accident 224, instructions for inspection 226, or instructions for report request 228 depending on different cases of the unexpected event 100, similar to that described in FIGS. 2 and 4.

At step 520, the operation server 400 determines whether the unexpected event 100 is addressed. In one example, in the case where the AV 602 is involved in accident 110, the operation server 400 may determine that the accident 110 is addressed based on updated sensor data 310 indicating that the AV 602 has been pulled over to a side of the road.

In another example, in the case where the AV 602 is requested to be inspected, the operation server 400 may determine that the inspection 120 is concluded by receiving a confirmation signal from the user 140 that the inspection 120 is concluded.

In another example, in the case where the AV 602 is requested to provide the report 134, the operation server 400 may determine that the report request 130 is concluded by receiving a confirmation signal from the user 140 that the report 134 is satisfactory.

If it is determined that the unexpected event 100 is not addressed, the method 500 repeats the step 520 and determine whether the unexpected event 100 is still addressed. The operation server 400 determines that the unexpected event 100 is addressed if it receives a confirmation signal from the user 140 that the unexpected event 100 is addressed. In other words, at step 520, the operation server 400 waits until it receives the confirmation signal from the user 140 indicating that the unexpected event 100 is addressed. If it is determined that the unexpected event 100 is addressed, method 500 proceeds to step 522 where the operation server 400 closes the ticket 214.

Example AV and its Operation

FIG. 6 shows a block diagram of an example vehicle ecosystem 600 in which autonomous driving operations can be determined. As shown in FIG. 6, the AV 602 may be a semi-trailer truck. The vehicle ecosystem 600 includes several systems and components that can generate and/or deliver one or more sources of information/data and related services to the in-vehicle control computer 650 that may be located in an AV 602. The in-vehicle control computer 650 can be in data communication with a plurality of vehicle subsystems 640, all of which can be resident in the AV 602. A vehicle subsystem interface 660 is provided to facilitate data communication between the in-vehicle control computer 650 and the plurality of vehicle subsystems 640. In some embodiments, the vehicle subsystem interface 660 can include a controller area network (CAN) controller to communicate with devices in the vehicle subsystems 640.

The AV 602 may include various vehicle subsystems that support of the operation of AV 602. The vehicle subsystems may include the control subsystem 300, emergency stop button 604, a vehicle drive subsystem 642, a vehicle sensor subsystem 644, and/or a vehicle control subsystem 648. The components or devices of the vehicle drive subsystem 642, the vehicle sensor subsystem 644, and the vehicle control subsystem 648 shown in FIG. 6 are examples. The AV 602 may be configured as shown or any other configurations.

The emergency stop button 604 may include a physical button that is configured to disconnect or disengage the autonomous functions of the AV 602 upon being activated. The emergency stop button 604 is in signal communication with the plurality of vehicle subsystems 640 and in-vehicle control computer 650. The emergency stop button 604 may be activated by any appropriate method, such as, by pressing down, pulling out, sliding, switching, using a key, etc. When activated, the emergency stop button 604 may start the fail-safe sequence to disengage the autonomous functions of the AV 602. In this process, when the emergency stop button 604 is activated, it disconnects control subsystem 300, vehicle drive subsystems 642, vehicle sensor subsystems 644, and vehicle control subsystem 648 from in-vehicle control computer 650. In other words, when the emergency stop button 604 is activated, it cuts the power from the autonomous systems of the AV 602. In one embodiment, when the emergency stop button 604 is activated, the engine 642a may be turned off, brake units 648b may be applied, and hazard lights may be turned on. Upon activation, the emergency stop button 604 may override all related start sequence functions of the AV 602.

The vehicle drive subsystem 642 may include components operable to provide powered motion for the AV 602. In an example embodiment, the vehicle drive subsystem 642 may include an engine/motor 642a, wheels/tires 642b, a transmission 642c, an electrical subsystem 642d, and a power source 642e.

The vehicle sensor subsystem 644 may include a number of sensors 646 configured to sense information about an environment or condition of the AV 602. The vehicle sensor subsystem 644 may include one or more cameras 646a or image capture devices, a Radar unit 646b, one or more temperature sensors 646c, a wireless communication unit 646d (e.g., a cellular communication transceiver), an inertial measurement unit (IMU) 646e, a laser range finder/LiDAR unit 646f, a Global Positioning System (GPS) transceiver 646g, and/or a wiper control system 646h. The vehicle sensor subsystem 644 may also include sensors configured to monitor internal systems of the AV 602 (e.g., an 02 monitor, a fuel gauge, an engine oil temperature, etc.).

The IMU 646e may include any combination of sensors (e.g., accelerometers and gyroscopes) configured to sense position and orientation changes of the AV 602 based on inertial acceleration. The GPS transceiver 646g may be any sensor configured to estimate a geographic location of the AV 602. For this purpose, the GPS transceiver 646g may include a receiver/transmitter operable to provide information regarding the position of the AV 602 with respect to the Earth. The Radar unit 646b may represent a system that utilizes radio signals to sense objects within the local environment of the AV 602. In some embodiments, in addition to sensing the objects, the Radar unit 646b may additionally be configured to sense the speed and the heading of the objects proximate to the AV 602. The laser range finder or LiDAR unit 646f may be any sensor configured to sense objects in the environment in which the AV 602 is located using lasers. The cameras 646a may include one or more devices configured to capture a plurality of images of the environment of the AV 602. The cameras 646a may be still image cameras or motion video cameras.

The vehicle control subsystem 648 may be configured to control the operation of the AV 602 and its components. Accordingly, the vehicle control subsystem 648 may include various elements such as a throttle and gear 648a, a brake unit 648b, a navigation unit 648c, a steering system 648d, and/or an autonomous control unit 648e. The throttle 648a may be configured to control, for instance, the operating speed of the engine and, in turn, control the speed of the AV 602. The gear 648a may be configured to control the gear selection of the transmission. The brake unit 648b can include any combination of mechanisms configured to decelerate the AV 602. The brake unit 648b can use friction to slow the wheels in a standard manner. The brake unit 648b may include an Anti-lock brake system (ABS) that can prevent the brakes from locking up when the brakes are applied. The navigation unit 648c may be any system configured to determine a driving path or route for the AV 602. The navigation 648c unit may additionally be configured to update the driving path dynamically while the AV 602 is in operation. In some embodiments, the navigation unit 648c may be configured to incorporate data from the GPS transceiver 646g and one or more predetermined maps so as to determine the driving path (e.g., along the roads 112, 132 of FIG. 1A-1C) for the AV 602. The steering system 648d may represent any combination of mechanisms that may be operable to adjust the heading of AV 602 in an autonomous mode or in a driver-controlled mode.

The autonomous control unit 648e may represent a control system configured to identify, evaluate, and avoid or otherwise negotiate potential obstacles or obstructions in the environment of the AV 602. In general, the autonomous control unit 648e may be configured to control the AV 602 for operation without a driver or to provide driver assistance in controlling the AV 602. In some embodiments, the autonomous control unit 648e may be configured to incorporate data from the GPS transceiver 646g, the Radar 646b, the LiDAR unit 646f, the cameras 646a, and/or other vehicle subsystems to determine the driving path or trajectory for the AV 602.

Many or all of the functions of the AV 602 can be controlled by the in-vehicle control computer 650. The in-vehicle control computer 650 may include at least one data processor 670 (which can include at least one microprocessor) that executes processing instructions 680 stored in a non-transitory computer readable medium, such as the data storage device 690 or memory. The in-vehicle control computer 650 may also represent a plurality of computing devices that may serve to control individual components or subsystems of the AV 602 in a distributed fashion. In some embodiments, the data storage device 690 may contain processing instructions 680 (e.g., program logic) executable by the data processor 670 to perform various methods and/or functions of the AV 602, including those described with respect to FIGS. 1A-C, 2, and 5.

The data storage device 690 may contain additional instructions as well, including instructions to transmit data to, receive data from, interact with, or control one or more of the vehicle drive subsystem 642, the vehicle sensor subsystem 644, and the vehicle control subsystem 648. The in-vehicle control computer 650 can be configured to include a data processor 670 and a data storage device 690. The in-vehicle control computer 650 may control the function of the AV 602 based on inputs received from various vehicle subsystems (e.g., the vehicle drive subsystem 642, the vehicle sensor subsystem 644, and the vehicle control subsystem 648).

FIG. 7 shows an exemplary system 700 for providing precise autonomous driving operations. The system 700 includes several modules that can operate in the in-vehicle control computer 650, as described in FIG. 6. The in-vehicle control computer 650 includes a sensor fusion module 702 shown in the top left corner of FIG. 7, where the sensor fusion module 702 may perform at least four image or signal processing operations. The sensor fusion module 702 can obtain images from cameras located on an autonomous vehicle to perform image segmentation 704 to detect the presence of moving objects (e.g., other vehicles, pedestrians, etc.) and/or static obstacles (e.g., stop sign, speed bump, terrain, etc.) located around the autonomous vehicle. The sensor fusion module 702 can obtain LiDAR point cloud data item from LiDAR sensors located on the autonomous vehicle to perform LiDAR segmentation 706 to detect the presence of objects and/or obstacles located around the autonomous vehicle.

The sensor fusion module 702 can perform instance segmentation 708 on image and/or point cloud data item to identify an outline (e.g., boxes) around the objects and/or obstacles located around the autonomous vehicle. The sensor fusion module 702 can perform temporal fusion 710 where objects and/or obstacles from one image and/or one frame of point cloud data item are correlated with or associated with objects and/or obstacles from one or more images or frames subsequently received in time.

The sensor fusion module 702 can fuse the objects and/or obstacles from the images obtained from the camera and/or point cloud data item obtained from the LiDAR sensors. For example, the sensor fusion module 702 may determine based on a location of two cameras that an image from one of the cameras comprising one half of a vehicle located in front of the autonomous vehicle is the same as the vehicle located captured by another camera. The sensor fusion module 702 sends the fused object information to the interference module 746 and the fused obstacle information to the occupancy grid module 760. The in-vehicle control computer includes the occupancy grid module 760 which can retrieve landmarks from a map database 758 stored in the in-vehicle control computer. The occupancy grid module 760 can determine drivable areas and/or obstacles from the fused obstacles obtained from the sensor fusion module 702 and the landmarks stored in the map database 758. For example, the occupancy grid module 760 can determine that a drivable area may include a speed bump obstacle.

Below the sensor fusion module 702, the in-vehicle control computer 650 includes a LiDAR based object detection module 712 that can perform object detection 716 based on point cloud data item obtained from the LiDAR sensors 714 located on the autonomous vehicle. The object detection 716 technique can provide a location (e.g., in 3D world coordinates) of objects from the point cloud data item. Below the LiDAR based object detection module 712, the in-vehicle control computer includes an image-based object detection module 718 that can perform object detection 724 based on images obtained from cameras 720 located on the autonomous vehicle. The object detection 724 technique can employ a deep machine learning technique 724 to provide a location (e.g., in 3D world coordinates) of objects from the image provided by the camera 720.

The Radar 756 on the autonomous vehicle can scan an area in front of the autonomous vehicle or an area towards which the autonomous vehicle is driven. The Radar data is sent to the sensor fusion module 702 that can use the Radar data to correlate the objects and/or obstacles detected by the Radar 756 with the objects and/or obstacles detected from both the LiDAR point cloud data item and the camera image. The Radar data is also sent to the interference module 746 that can perform data processing on the Radar data to track objects by object tracking module 748 as further described below.

The in-vehicle control computer includes an interference module 746 that receives the locations of the objects from the point cloud and the objects from the image, and the fused objects from the sensor fusion module 702. The interference module 746 also receives the Radar data with which the interference module 746 can track objects by object tracking module 748 from one point cloud data item and one image obtained at one time instance to another (or the next) point cloud data item and another image obtained at another subsequent time instance.

The interference module 746 may perform object attribute estimation 750 to estimate one or more attributes of an object detected in an image or point cloud data item. The one or more attributes of the object may include a type of object (e.g., pedestrian, car, or truck, etc.). The interference module 746 may perform behavior prediction 752 to estimate or predict motion pattern of an object detected in an image and/or a point cloud. The behavior prediction 752 can be performed to detect a location of an object in a set of images received at different points in time (e.g., sequential images) or in a set of point cloud data item received at different points in time (e.g., sequential point cloud data items). In some embodiments the behavior prediction 752 can be performed for each image received from a camera and/or each point cloud data item received from the LiDAR sensor. In some embodiments, the interference module 746 can be performed (e.g., run or executed) to reduce computational load by performing behavior prediction 752 on every other or after every pre-determined number of images received from a camera or point cloud data item received from the LiDAR sensor (e.g., after every two images or after every three point cloud data items).

The behavior prediction 752 feature may determine the speed and direction of the objects that surround the autonomous vehicle from the Radar data, where the speed and direction information can be used to predict or determine motion patterns of objects. A motion pattern may comprise a predicted trajectory information of an object over a pre-determined length of time in the future after an image is received from a camera. Based on the motion pattern predicted, the interference module 746 may assign motion pattern situational tags to the objects (e.g., "located at coordinates (x,y)," "stopped," "driving at 50 mph," "speeding up" or "slowing down"). The situation tags can describe the motion pattern of the object. The interference module 746 sends the one or more object attributes (e.g., types of the objects) and motion pattern situational tags to the planning module 762. The interference module 746 may perform an environment analysis 754 using any information acquired by system 700 and any number and combination of its components.

The in-vehicle control computer includes the planning module 762 that receives the object attributes and motion pattern situational tags from the interference module 746, the drivable area and/or obstacles, and the vehicle location and pose information from the fused localization module 726 (further described below).

The planning module 762 can perform navigation planning 764 to determine a set of trajectories on which the autonomous vehicle can be driven. The set of trajectories can be determined based on the drivable area information, the one or more object attributes of objects, the motion pattern situational tags of the objects, location of the obstacles, and the drivable area information. In some embodiments, the navigation planning 764 may include determining an area next to the road where the autonomous vehicle can be safely parked in case of emergencies. The planning module 762 may include behavioral decision making 766 to determine driving actions (e.g., steering, braking, throttle) in response to determining changing conditions on the road (e.g., traffic light turned yellow, or the autonomous vehicle is in an unsafe driving condition because another vehicle drove in front of the autonomous vehicle and in a region within a pre-determined safe distance of the location of the autonomous vehicle). The planning module 762 performs trajectory generation 768 and selects a trajectory from the set of trajectories determined by the navigation planning operation 764. The selected trajectory information is sent by the planning module 762 to the control module 770.

The in-vehicle control computer includes a control module 770 that receives the proposed trajectory from the planning module 762 and the autonomous vehicle location and pose from the fused localization module 726. The control module 770 includes a system identifier 772. The control module 770 can perform a model based trajectory refinement 774 to refine the proposed trajectory. For example, the control module 770 can applying a filtering (e.g., Kalman filter) to make the proposed trajectory data smooth and/or to minimize noise. The control module 770 may perform the robust control 776 by determining, based on the refined proposed trajectory information and current location and/or pose of the autonomous vehicle, an amount of brake pressure to apply, a steering angle, a throttle amount to control the speed of the vehicle, and/or a transmission gear. The control module 770 can send the determined brake pressure, steering angle, throttle amount, and/or transmission gear to one or more devices in the autonomous vehicle to control and facilitate precise driving operations of the autonomous vehicle.

The deep image-based object detection 724 performed by the image based object detection module 718 can also be used detect landmarks (e.g., stop signs, speed bumps, etc.) on the road. The in-vehicle control computer includes a fused localization module 726 that obtains landmarks detected from images, the landmarks obtained from a map database 736 stored on the in-vehicle control computer, the landmarks detected from the point cloud data item by the LiDAR based object detection module 712, the speed and displacement from the odometer sensor 744 and the estimated location of the autonomous vehicle from the GPS/IMU sensor 738 (i.e., GPS sensor 740 and IMU sensor 742) located on or in the autonomous vehicle. Based on this information, the fused localization module 726 can perform a localization operation 728 to determine a location of the autonomous vehicle, which can be sent to the planning module 762 and the control module 770.

The fused localization module 726 can estimate pose 730 of the autonomous vehicle based on the GPS and/or IMU sensors 738. The pose of the autonomous vehicle can be sent to the planning module 762 and the control module 770. The fused localization module 726 can also estimate status (e.g., location, possible angle of movement) of the trailer unit based on (e.g., trailer status estimation 734), for example, the information provided by the IMU sensor 742 (e.g., angular rate and/or linear velocity). The fused localization module 726 may also check the map content 732.

Figure 8:
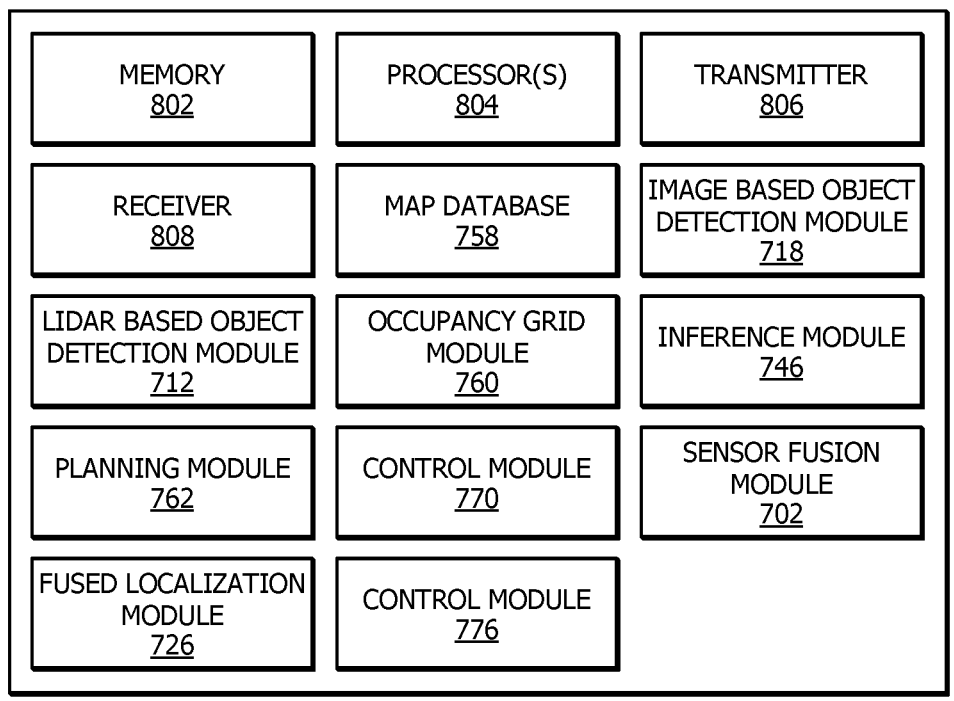
FIG. 8 illustrates a block diagram of an in-vehicle control computer included in the AV of FIG. 6.

FIG. 8 shows an exemplary block diagram of an in-vehicle control computer 650 included in an autonomous AV 602. The in-vehicle control computer 650 includes at least one processor 804 and a memory 802 having instructions stored thereupon (e.g., software instructions 308, 410, and processing instructions 680 in FIGS. 4, 5, and 6, respectively). The instructions, upon execution by the processor 804, configure the in-vehicle control computer 650 and/or the various modules of the in-vehicle control computer 650 to perform the operations described in FIGS. 1A-7. The transmitter 806 transmits or sends information or data to one or more devices in the autonomous vehicle. For example, the transmitter 806 can send an instruction to one or more motors of the steering wheel to steer the autonomous vehicle. The receiver 808 receives information or data transmitted or sent by one or more devices. For example, the receiver 808 receives a status of the current speed from the odometer sensor or the current transmission gear from the transmission. The transmitter 806 and receiver 808 are also configured to communicate with plurality of vehicle subsystems 640 and the in-vehicle control computer 650 described above in FIGS. 6 and 7.

While several embodiments have been provided in this disclosure, it should be understood that the disclosed systems and methods might be embodied in many other specific forms without departing from the spirit or scope of this disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of this disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

Implementations of the disclosure can be described in view of the following clauses, the features of which can be combined in any reasonable manner.

Clause 1. A system, comprising:

an autonomous vehicle (AV) comprising at least one vehicle sensor located on the AV, wherein the AV is on a road;

a control subsystem associated with the AV and comprising a first processor configured to:

receive sensor data from the at least one vehicle sensor of the AV, wherein the sensor data comprises location coordinates of the AV;

communicate the sensor data to an operation server;

the operation server, communicatively coupled with the control subsystem, comprising:

a memory operable to store login credentials of a user to an application by which the user is authorized to access information related to the AV; and a second processor, operably coupled with the memory, configured to:

detect an unexpected event related to the AV from the sensor data, wherein the unexpected event comprises at least one of an accident, an inspection, and a report request related to the AV;

receive a message from an electronic device associated with the user, wherein:

the message comprises a request to access particular information regarding the AV; and the message further comprises location data of the user;

determine whether the location data of the user matches the location coordinates of the AV;

in response to determining that the location data of the user matches the location coordinates of the AV, associate the AV with the user;

generate a ticket for the unexpected event to record events that will be carried out to address the unexpected event;

establish a communication path between the user and a remote operator using the electronic device;

communicate the particular information related to the AV to the electronic device via the communication path;

receive a request from the user to provide assistance to address the unexpected event;

provide instructions to the remote operator to forward to the user to address the unexpected event;

determine whether the unexpected event is addressed; and in response to determining that the unexpected event is addressed, close the ticket.

Clause 2. The system of Clause 1, wherein when the unexpected event comprises the accident involving the AV, providing instructions to the remote operator to forward to the user to address the unexpected event comprises:

remotely granting the user entry to enter a cab of the AV;

disengaging autonomous operations of the AV; and providing instructions to the remote operator to forward to the user to manually operate the AV without an ignition key.

Clause 3. The system of Clause 2, wherein disengaging the autonomous operations of the AV comprises at least one of:

remotely disengaging the autonomous operations of the AV by the second processor; and providing instructions to the remote operator to forward to the user to locally disengage the autonomous operations of the AV by an emergency stop button.

Clause 4. The system of Clause 1, wherein the second processor is further configured to:

determine whether it is safe to manually operate the AV based at least in part upon health diagnostics of the AV;

in response to determining that it is safe to manually operate the AV, provide instruction to the remote operator to inform the user that it is safe to operate the AV; and in response to determining that it is not safe to manually operate the AV, dispatch a towing truck to move the AV.

Clause 5. The system of Clause 1, wherein:

the AV further comprises one or more user interfaces inside a cab of the AV comprising a speaker, a microphone, and a display screen; and the second processor is further configured to:

establish a second communication path between the user and the remote operator using the one or more user interfaces; and communicate the particular information related to the AV to the user via the second communication path.

Clause 6. The system of Clause 1, wherein the assistance comprises at least one of:

an emergency assist when the unexpected event comprises the accident involving the AV;

an inspection assist when the unexpected event comprises the inspection of the AV, and a reporting assist when the unexpected event comprises the report request.

Clause 7. The system of Clause 1, wherein when the unexpected event comprises the inspection of the AV, providing instructions to the remote operator to forward to the user to address the unexpected event comprises communicating information related to the AV requested by the user to the electronic device comprising at least one of:

a first status report of autonomous faculties of the AV comprising one or more of autonomous functions, map data, routing plans, and sensor functions; and a second status report of physical characteristics of the AV comprising one or more of a digital weight of the AV, a cargo of the AV, and a digital temperature of an engine of the AV.

Clause 8. The system of Clause 1, wherein when the unexpected event comprises the report request, providing instructions to the remote operator to forward to the user to address the unexpected event comprises communicating a driving history of the AV in a particular time range requested by the user to the electronic device, wherein the driving history comprises a speed of the AV.

Clause 9. A method, comprising:

detecting an unexpected event related to an autonomous vehicle (AV) from sensor data received from at least one vehicle sensor of the AV, wherein the unexpected event comprises at least one of an accident, an inspection, and a report request related to the AV;

receiving a message from an electronic device associated with a user, wherein:

the user is authenticated by verifying login credentials associated with the user on an application on the electronic device;

the message comprises a request to access particular information regarding the AV; and the message further comprises location data of the user;

determining whether the location data of the user matches the location coordinates of the AV;

in response to determining that the location data of the user matches the location coordinates of the AV, associating the AV with the user;

generating a ticket for the unexpected event to record events that will be carried out to address the unexpected event;

establishing a communication path between the user and a remote operator using the electronic device;

communicating the particular information related to the AV to the electronic device via the communication path;

receiving a request from the user to provide assistance to address the unexpected event;

providing instructions to the remote operator to forward to the user to address the unexpected event;

determining whether the unexpected event is addressed; and in response to determining that the unexpected event is addressed, closing the ticket.

Clause 10. The method of Clause 9, determining whether it is safe to manually operate the AV based at least in part upon health diagnostics of the AV;

in response to determining that it is safe to manually operate the AV, providing instruction to the remote operator to inform the user that it is safe to operate the AV; and in response to determining that it is not safe to manually operate the AV, dispatching a towing truck to move the AV.

Clause 11. The method of Clause 9, further comprising:

establishing a second communication path between the user and the remote operator using one or more user interfaces inside a cab of the AV comprising a speaker, a microphone, and a display screen; and communicating the particular information related to the AV to the user via the second communication path.

Clause 12. The method of Clause 9, further comprising:
receiving one or more images from the environment surrounding the AV involved in the unexpected event from the user via the communication path;
based at least in part upon the one or more images:
updating sensor data associated with the unexpected event; and
updating the instructions to forward to the user for addressing the unexpected event.

Clause 13. The method of Clause 9, wherein when the unexpected event comprises the inspection of the AV, providing instructions to the remote operator to forward to the user to address the unexpected event comprises communicating information related to the AV requested by the user to the electronic device comprising at least one of:
a first status report of autonomous faculties of the AV comprising one or more of autonomous functions, map data, routing plans, and sensor functions; and
a second status report of physical characteristics of the AV comprising one or more of a digital weight of the AV, a cargo of the AV, and a digital temperature of an engine of the AV.

Clause 14. The method of Clause 9, further comprising:
receiving a confirmation signal from the user indicating that the unexpected event is addressed; and
in response to receiving the confirmation signal, determining that the unexpected event is addressed.

Clause 15. A computer program comprising executable instructions stored in a non-transitory computer-readable medium that when executed by one or more processors causes the one or more processors to:
detect an unexpected event related to an autonomous vehicle (AV) from sensor data received from at least one vehicle sensor of the AV, wherein the unexpected event comprises at least one of an accident, an inspection, and a report request related to the AV;
receive a message from an electronic device associated with a user, wherein:
the user is authenticated by verifying login credentials associated with the user on an application on the electronic device;
the message comprises a request to access particular information regarding the AV; and
the message further comprises location data of the user;
determine whether the location data of the user matches the location coordinates of the AV;
in response to determining that the location data of the user matches the location coordinates of the AV, associate the AV with the user;
generate a ticket for the unexpected event to record events that will be carried out to address the unexpected event;
establish a communication path between the user and a remote operator using the electronic device;
communicate the particular information related to the AV to the electronic device via the communication path;
receive a request from the user to provide assistance to address the unexpected event;
provide instructions to the remote operator to forward to the user to address the unexpected event;
determine whether the unexpected event is addressed; and
in response to determining that the unexpected event is addressed, close the ticket.

Clause 16. The computer program of Clause 15, wherein receiving the message from the electronic device associated with the user comprises at least one of:
receive the message from an application installed on the electronic device, wherein the application is associated with an operation server that is in signal communication with the AV; and
receive the message from a third-party application installed on the electronic device.

Clause 17. The computer program of Clause 15, wherein when the unexpected event comprises the accident involving the AV, providing instructions to the remote operator to forward to the user to address the unexpected event comprises:
remotely granting the user entry to enter a cab of the AV;
disengaging autonomous operations of the AV; and
providing instructions to the remote operator to forward to the user to manually operate the AV without an ignition key.

Clause 18. The computer program of Clause 15, wherein the one or more processors are further configured to:
determine whether it is safe to manually operate the AV based at least in part upon health diagnostics of the AV;
in response to determining that it is safe to manually operate the AV, provide instruction to the remote operator to inform the user that it is safe to operate the AV; and
in response to determining that it is not safe to manually operate the AV, dispatch a towing truck to move the AV.

Clause 19. The computer program of Clause 15, wherein the one or more processors are further configured to:
establish a second communication path between the user and the remote operator using one or more user interfaces inside a cab of the AV comprising a speaker, a microphone, and a display screen; and
communicate the particular information related to the AV to the user via the second communication path.

Clause 20. The computer program of Clause 15, wherein when the unexpected event comprises the inspection of the AV, providing instructions to the remote operator to forward to the user to address the unexpected event comprises communicating information related to the AV requested by the user to the electronic device comprising at least one of:
a first status report of autonomous faculties of the AV comprising one or more of autonomous functions, map data, routing plans, and sensor functions; and
a second status report of physical characteristics of the AV comprising one or more of a digital weight of the AV, a cargo of the AV, and a digital temperature of an engine of the AV.

What is claimed is:
1. A system, comprising:
an operation server comprising:
a memory; and
a processor, operably coupled with the memory, configured to:
detect an unexpected event related to an autonomous vehicle from sensor data, wherein the unexpected event comprises at least one of an accident, an inspection, and a report request related to the autonomous vehicle;
receive a message from an electronic device associated with a user, wherein:
the message comprises a request to access particular information regarding the autonomous vehicle; and
the message further comprises location data of the user;
receive location coordinates of the autonomous vehicle;
determine whether the location data of the user matches the location coordinates of the autonomous vehicle;

in response to determining that the location data of the user matches the location coordinates of the autonomous vehicle, associate the autonomous vehicle with the user;

establish a communication path between the user and a remote operator using the electronic device;

communicate the particular information related to the autonomous vehicle corresponding to the unexpected event to the electronic device;

receive a request from the user to provide assistance to address the unexpected event; and provide instructions corresponding to the assistance to the remote operator to forward to the user via the communication path, wherein providing instructions to the remote operator to forward to the user to address the unexpected event comprises:

remotely granting the user entry to enter a cab of the autonomous vehicle;

disengaging autonomous operations of the autonomous vehicle; and providing instructions to the remote operator to forward to the user to manually operate the autonomous vehicle without an ignition key.

2. The system of claim 1, wherein disengaging the autonomous operations of the autonomous vehicle comprises at least one of:

remotely disengaging the autonomous operations of the autonomous vehicle by the processor; or providing instructions to the remote operator to forward to the user to locally disengage the autonomous operations of the autonomous vehicle by an emergency stop button.

3. The system of claim 1, wherein the processor is further configured to:

determine whether it is safe to manually operate the autonomous vehicle based at least in part upon health diagnostics of the autonomous vehicle;

in response to determining that it is safe to manually operate the autonomous vehicle, provide instruction to the remote operator to inform the user that it is safe to operate the autonomous vehicle; or in response to determining that it is not safe to manually operate the autonomous vehicle, dispatch a towing truck to move the autonomous vehicle.

4. The system of claim 1, wherein:

the autonomous vehicle further comprises one or more user interfaces inside a cab of the autonomous vehicle comprising a speaker, a microphone, and a display screen; and the processor is further configured to:

establish a second communication path between the user and the remote operator using the one or more user interfaces; and communicate the particular information related to the autonomous vehicle to the user via the second communication path.

5. The system of claim 1, wherein the assistance comprises at least one of:

an emergency assist when the unexpected event comprises the accident involving the autonomous vehicle, an inspection assist when the unexpected event comprises the inspection of the autonomous vehicle, or a reporting assist when the unexpected event comprises the report request.

6. The system of claim 1, wherein when the unexpected event comprises the inspection of the autonomous vehicle, providing instructions to the remote operator to forward to the user to address the unexpected event comprises communicating information related to the autonomous vehicle requested by the user to the electronic device comprising at least one of:

a first status report of autonomous faculties of the autonomous vehicle comprising one or more of autonomous functions, map data, routing plans, and sensor functions; or a second status report of physical characteristics of the autonomous vehicle comprising one or more of a digital weight of the autonomous vehicle, a cargo of the autonomous vehicle, and a digital temperature of an engine of the autonomous vehicle.

7. The system of claim 1, wherein when the unexpected event comprises the report request, providing instructions to the remote operator to forward to the user to address the unexpected event comprises communicating a driving history of the autonomous vehicle in a particular time range requested by the user to the electronic device, wherein the driving history comprises a speed of the autonomous vehicle.

8. A method, comprising:

detecting an unexpected event related to an autonomous vehicle from sensor data received from at least one vehicle sensor of the autonomous vehicle, wherein the unexpected event comprises at least one of an accident, an inspection, and a report request related to the autonomous vehicle; receiving a message from an electronic device associated with a user, wherein:

the message comprises a request to access particular information regarding an autonomous vehicle; and the message further comprises location data of the user;

receiving location coordinates of the autonomous vehicle;

determining whether the location data of the user matches the location coordinates of the autonomous vehicle;

in response to determining that the location data of the user matches the location coordinates of the autonomous vehicle, associating the autonomous vehicle with the user;

establishing a communication path between the user and a remote operator using the electronic device;

communicating the particular information related to the autonomous vehicle corresponding to the unexpected event to the electronic device;

receiving a request from the user to provide assistance to address the unexpected event; and providing instructions corresponding to the assistance to the remote operator to forward to the user via the communication path, wherein providing instructions to the remote operator to forward to the user to address the unexpected event comprises:

remotely granting the user entry to enter a cab of the autonomous vehicle;

disengaging autonomous operations of the autonomous vehicle; and providing instructions to the remote operator to forward to the user to manually operate the autonomous vehicle without an ignition key.

9. The method of claim 8, further comprising:

determining whether it is safe to manually operate the autonomous vehicle based at least in part upon health diagnostics of the autonomous vehicle;

in response to determining that it is safe to manually operate the autonomous vehicle, providing instruction to the remote operator to inform the user that it is safe to operate the autonomous vehicle; and in response to determining that it is not safe to manually operate the autonomous vehicle, dispatching a towing truck to move the autonomous vehicle.

10. The method of claim 8, further comprising:

establishing a second communication path between the user and the remote operator using one or more user interfaces inside a cab of the autonomous vehicle comprising a speaker, a microphone, and a display screen; and communicating the particular information related to the autonomous vehicle to the user via the second communication path.

11. The method of claim 8, further comprising:

receiving one or more images from an environment surrounding the autonomous vehicle involved in the unexpected event from the user via the communication path;

based at least in part upon the one or more images:
updating sensor data associated with the unexpected event; and
updating the instructions to forward to the user for addressing the unexpected event.

12. The method of claim 8, wherein when the unexpected event comprises the inspection of the autonomous vehicle, providing instructions to the remote operator to forward to the user to address the unexpected event comprises communicating information related to the autonomous vehicle requested by the user to the electronic device comprising at least one of:

a first status report of autonomous faculties of the autonomous vehicle comprising one or more of autonomous functions, map data, routing plans, and sensor functions; or a second status report of physical characteristics of the autonomous vehicle comprising one or more of a digital weight of the autonomous vehicle, a cargo of the autonomous vehicle, and a digital temperature of an engine of the autonomous vehicle.

13. The method of claim 8, further comprising:

receiving a confirmation signal from the user indicating that the unexpected event is addressed; and in response to receiving the confirmation signal, determining that the unexpected event is addressed.

14. A non-transitory computer readable medium storing executable instructions that, when executed by one or more processors, cause the one or more processors to:

detect an unexpected event related to an autonomous vehicle from sensor data received from at least one vehicle sensor of the autonomous vehicle, wherein the unexpected event comprises at least one of an accident, an inspection, and a report request related to the autonomous vehicle;

receive a message from an electronic device associated with a user, wherein:
the message comprises a request to access particular information regarding the autonomous vehicle; and
the message further comprises location data of the user;

receive location coordinates of the autonomous vehicle;

determine whether the location data of the user matches the location coordinates of the autonomous vehicle;

in response to determining that the location data of the user matches location coordinates of the autonomous vehicle, associate the autonomous vehicle with the user;

establish a communication path between the user and a remote operator using the electronic device;

communicate the particular information related to the autonomous vehicle corresponding to the unexpected event to the electronic device;

receive a request from the user to provide assistance to address the unexpected event; and provide instructions corresponding to the assistance to the remote operator to forward to the user to address the unexpected event via the communication path, wherein providing instructions to the remote operator to forward to the user to address the unexpected event comprises:
remotely granting the user entry to enter a cab of the autonomous vehicle;
disengaging autonomous operations of the autonomous vehicle; and
providing instructions to the remote operator to forward to the user to manually operate the autonomous vehicle without an ignition key.

15. The non-transitory computer readable medium of claim 14, wherein receiving the message from the electronic device associated with the user comprises at least one of:

receive the message from an application installed on the electronic device, wherein the application is associated with an operation server that is in signal communication with the autonomous vehicle; or receive the message from a third-party application installed on the electronic device.

16. The non-transitory computer readable medium of claim 14, wherein the instructions further cause the one or more processors to:

determine whether it is safe to manually operate the autonomous vehicle based at least in part upon health diagnostics of the autonomous vehicle;

in response to determining that it is safe to manually operate the autonomous vehicle, provide instruction to the remote operator to inform the user that it is safe to operate the autonomous vehicle; and in response to determining that it is not safe to manually operate the autonomous vehicle, dispatch a towing truck to move the autonomous vehicle.

17. The non-transitory computer readable medium of claim 15, wherein the instructions further cause the one or more processors to:

establish a second communication path between the user and the remote operator using one or more user interfaces inside a cab of the autonomous vehicle comprising a speaker, a microphone, and a display screen; and communicate the particular information related to the autonomous vehicle to the user via the second communication path.

18. The non-transitory computer readable medium of claim 15, wherein when the unexpected event comprises the inspection of the autonomous vehicle, providing instructions to the remote operator to forward to the user to address the unexpected event comprises communicating information related to the autonomous vehicle requested by the user to the electronic device comprising at least one of:

a first status report of autonomous faculties of the autonomous vehicle comprising one or more of autonomous functions, map data, routing plans, and sensor functions; or a second status report of physical characteristics of the autonomous vehicle comprising one or more of a digital weight of the autonomous vehicle, a cargo of the autonomous vehicle, and a digital temperature of an engine of the autonomous vehicle.

* * * * *